(12) United States Patent
Ebrahimi Tazeh Mahalleh et al.

(10) Patent No.: US 9,025,574 B2
(45) Date of Patent: May 5, 2015

(54) METHODS OF CHANNEL STATE INFORMATION FEEDBACK AND TRANSMISSION IN COORDINATED MULTI-POINT WIRELESS COMMUNICATIONS SYSTEM

(75) Inventors: Masoud Ebrahimi Tazeh Mahalleh, Ottawa (CA); Shiwei Gao, Nepean (CA); Yongkang Jia, Ottawa (CA); Tarik Tabet, Montreal (CA); Hua Xu, Ottawa (CA)

(73) Assignee: BlackBerry Limited, Waterloo, Ontario, CA (US)

( * ) Notice: Subject to any disclaimer, the term of this patent is extended or adjusted under 35 U.S.C. 154(b) by 275 days.

(21) Appl. No.: 13/545,632

(22) Filed: Jul. 10, 2012

(65) Prior Publication Data

US 2013/0039349 A1  Feb. 14, 2013

Related U.S. Application Data

(60) Provisional application No. 61/523,056, filed on Aug. 12, 2011.

(51) Int. Cl.
*H04W 72/04* (2009.01)
*H04J 3/00* (2006.01)
(Continued)

(52) U.S. Cl.
CPC .............. *H04B 7/024* (2013.01); *H04W 4/00* (2013.01); *H04L 1/0013* (2013.01); *H04L 1/0031* (2013.01); *H04L 1/0668* (2013.01); *H04L 5/0048* (2013.01); *H04L 5/0057* (2013.01); *H04L 5/0091* (2013.01); *H04L 25/03955* (2013.01); *H04L 5/0035* (2013.01);
(Continued)

(58) Field of Classification Search
CPC ... H04L 1/0013; H04L 1/0031; H04L 5/0048; H04L 5/0057; H04L 25/03955; H04L 5/0035; H04L 5/0091; H04L 5/005; H04L 5/0051; H04B 7/024; H04B 7/0669; H04B 7/0619–7/0663; H04W 4/00
USPC .................................................. 370/336, 329
See application file for complete search history.

(56) References Cited

U.S. PATENT DOCUMENTS

2008/0031369 A1  2/2008  Li et al.
2010/0118817 A1  5/2010  Damnjanovic et al.
(Continued)

FOREIGN PATENT DOCUMENTS

CN  101771437 A  7/2010
WO  2009119988 A1  10/2009
(Continued)

OTHER PUBLICATIONS

ETSI TS 136 213 V8.8.0, Oct. 2009, pp. 20, 21, 33-49.*
(Continued)

*Primary Examiner* — Thai Hoang
*Assistant Examiner* — Kenneth P Hunt
(74) *Attorney, Agent, or Firm* — Conley Rose, P.C.; J. Robert Brown, Jr.

(57) ABSTRACT

An apparatus and method for feedback solutions that function in conjunction with CoMP transmissions. The feedback solutions are applicable to joint transmission (JT) as well as coordinated scheduling (CS) and coordinated beamforming (CB). Embodiments of the present disclosure are described herein in the context of a wireless network in compliance with LTE standards.

11 Claims, 16 Drawing Sheets

(51) Int. Cl.
| | |
|---|---|
| *H04W 4/00* | (2009.01) |
| *H04B 7/02* | (2006.01) |
| *H04L 1/00* | (2006.01) |
| *H04L 5/00* | (2006.01) |
| *H04L 25/03* | (2006.01) |
| *H04L 1/06* | (2006.01) |
| *H04B 7/06* | (2006.01) |

(52) U.S. Cl.
CPC .............. *H04B 7/063* (2013.01); *H04B 7/0632* (2013.01); *H04B 7/0639* (2013.01); *H04B 7/0669* (2013.01)

(56) References Cited

U.S. PATENT DOCUMENTS

| | | | |
|---|---|---|---|
| 2010/0173660 | A1 | 7/2010 | Liu et al. |
| 2010/0238824 | A1 | 9/2010 | Farajidana et al. |
| 2010/0271968 | A1* | 10/2010 | Liu et al. ........................ 370/252 |
| 2011/0064115 | A1 | 3/2011 | Xu et al. |
| 2011/0170435 | A1 | 7/2011 | Kim et al. |
| 2012/0207092 | A1 | 8/2012 | Zirwas et al. |
| 2012/0287799 | A1* | 11/2012 | Chen et al. ..................... 370/252 |
| 2013/0003788 | A1* | 1/2013 | Marinier et al. .............. 375/219 |
| 2013/0223253 | A1* | 8/2013 | Enescu et al. ................. 370/252 |

FOREIGN PATENT DOCUMENTS

| | | | |
|---|---|---|---|
| WO | 2010147416 | A2 | 12/2010 |
| WO | 2011023216 | A1 | 3/2011 |
| WO | 2011055940 | A2 | 5/2011 |

OTHER PUBLICATIONS

Kiiski, Matti; "LTE-Advanced: The Mainstream in Mobile Broadband Evolution"; 2010 European Wireless Conference; 6 pages.

Thomas, Timothy A., et al.; "CSI Reference Signal Designs for Enabling Closed-Loop MIMO Feedback"; IEEE; Sep. 2010; 5 pages.

Jungnickel, V., et al.; "Coordinated Multipoint Trials in the Downlink"; IEEE; Dec. 2009; 7 pages.

PCT International Search Report; Application No. PCT/CA2012/050538; Nov. 7, 2012; 6 pages.

PCT Written Opinion of the International Searching Authority; Application No. PCT/CA2012/050538; Nov. 7, 2012; 9 pages.

PCT International Search Report; Application No. PCT/CA2012/050543; Nov. 14, 2012; 5 pages.

PCT Written Opinion of the International Searching Authority; Application No. PCT/CA2012/050543; Nov. 14, 2012; 7 pages.

Ebrahimi Tazeh Mahalleh, Masoud, et al.; U.S. Appl. No. 13/548,650, filed Jul. 10, 2012; Title: Method of Channle State Information Feedback and Transmission in Coordinated Multi-Point Wireless Communications System.

3GPP TS 36.212 V10.6.0; 3rd Generation Partnership Project; Technical Specification Group Radio Access Network; Evolved Universal Terrestrial Radio Access (E-UTRA); Multiplexing and Channel Coding; Release 10; Jun. 2012; 79 pages.

3GPP TS 36.213 V10.6.0; 3rd Generation Partnership Project; Technical Specification Group Radio Access Network; Evolved Universal Terrestrial Radio Access (E-UTRA); Physical Layer Procedures; Release 10; Jun. 2012; 125 pages.

Ebrahimi Tazeh Mahalleh, Masoud, et al.; U.S. Appl. No. 14/498,068, filed Sep. 26, 2014; Title: Methods of Channel State Information Feedback and Transmission in Coordinated Multi-Point Wireless Communications System; 99 Pages.

Office Action dated Aug. 15, 2014; U.S. Appl. No. 13/545,650, filed Jul. 10, 2012; 11 pages.

Office Action dated Sep. 26, 2014; U.S. Appl. No. 13/545,650, filed Jul. 10, 2012; 9 pages.

European Extended Search Report; Application No. 12823759.1; Mar. 4, 2015; 7 pages.

* cited by examiner

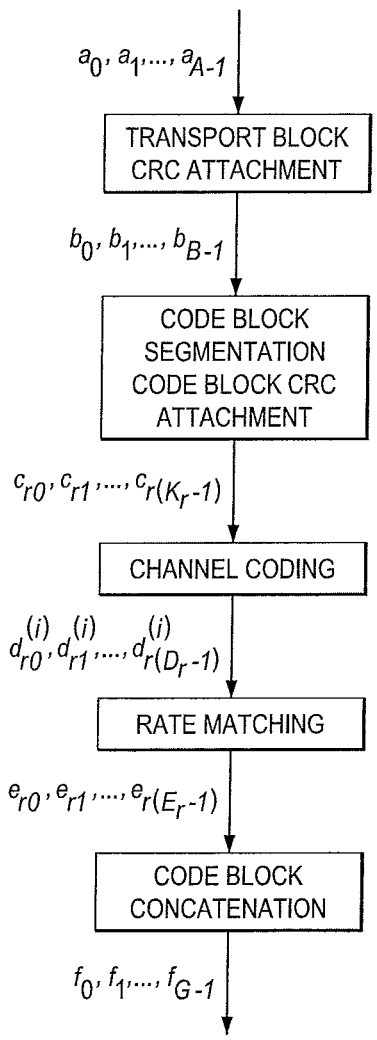

FIG. 7
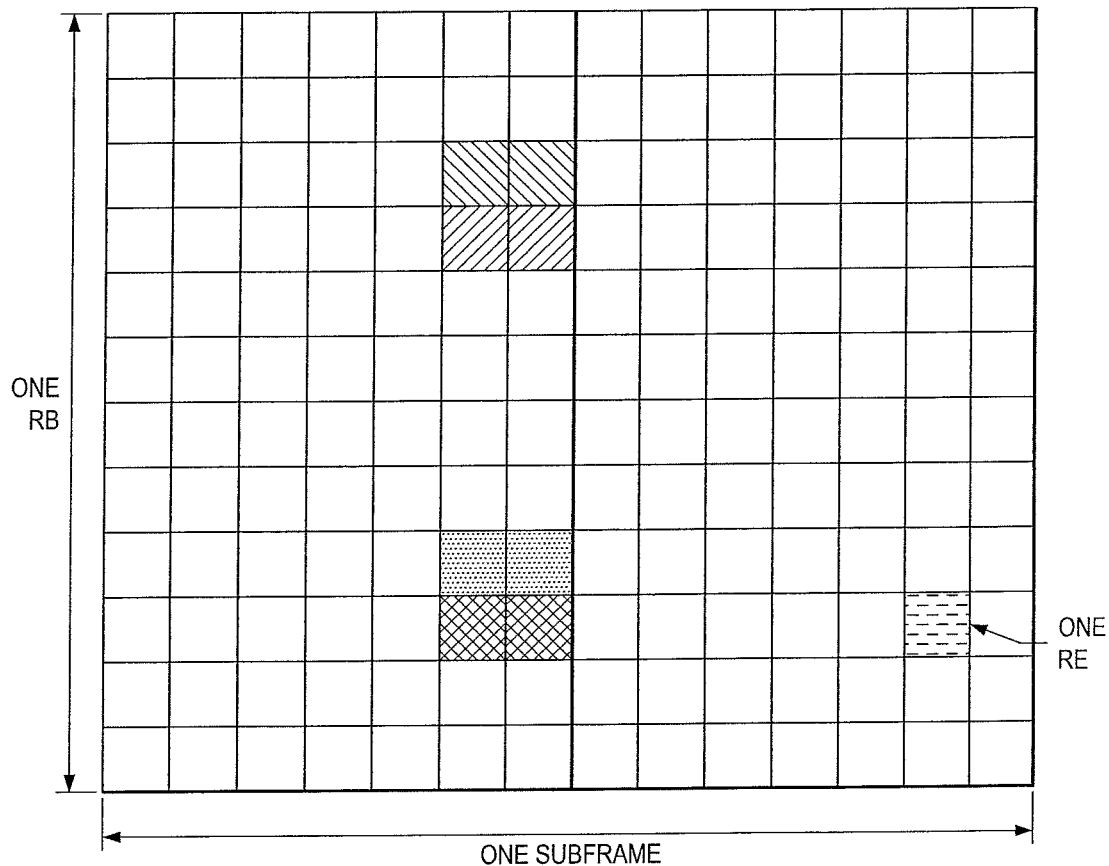
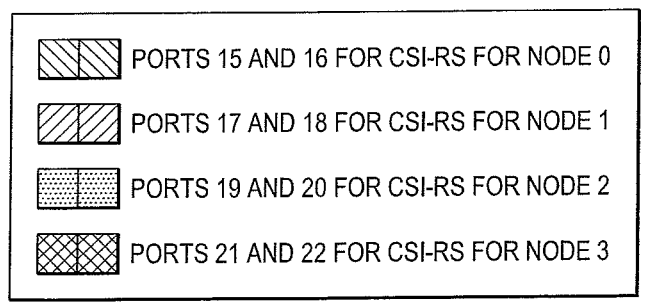

METHODS OF CHANNEL STATE INFORMATION FEEDBACK AND TRANSMISSION IN COORDINATED MULTI-POINT WIRELESS COMMUNICATIONS SYSTEM

CROSS-REFERENCE TO RELATED APPLICATIONS

The present application claims priority to U.S. Provisional Application No. 61/523,056 filed Aug. 12, 2011 by Masoud Ebrahimi Tazeh Mahalleh, et al., entitled "Methods of Channel State Information Feedback and Transmission in Coordinated Multi-Point Wireless Communications System" which is incorporated by reference herein as if reproduced in its entirety.

BACKGROUND OF THE INVENTION

1. Field of the Invention

The present disclosure is directed in general to communications systems and more particularly, to channel state information feedback and data transmission in coordinated multi-point (CoMP) wireless communications systems.

2. Description of the Related Art

In known wireless telecommunications systems, transmission equipment in a base station or access device transmits signals throughout a geographical region which is known as a cell. As technology has evolved, more advanced equipment has been introduced that can provide services that were not possible previously. This advanced equipment might include, for example, an E-UTRAN (evolved universal terrestrial radio access network) node B (eNB), a base station or other systems and devices. Such advanced or next generation equipment is often referred to as long-term evolution (LTE) equipment, and a packet-based network that uses such equipment is often referred to as an evolved packet system (EPS). An access device is any component, such as a traditional base station or an LTE eNB (Evolved Node B), which can provide user equipment (UE) or mobile equipment (ME) with access to other components in a telecommunications system.

Coordinated multi-point (CoMP) transmission and reception is one solution for providing a more ubiquitous user experience in wireless communication systems especially for users at cell-edge. In known CoMP systems, the feedback procedure is often designed based on single cell non-cooperative scenarios, and in some scenarios additional feedback would be needed.

BRIEF DESCRIPTION OF THE DRAWINGS

The present disclosure may be understood, and its numerous objects, features and advantages obtained, when the following detailed description is considered in conjunction with the following drawings, in which:

FIG. 5 shows a flow chart of a method of transmission block processing for downlink shared channel according to one embodiment.

FIG. 7 shows a block diagram of an example of a CSI-RS configuration for four nodes in a cell, each with two antenna ports.

DETAILED DESCRIPTION

Figure 1:
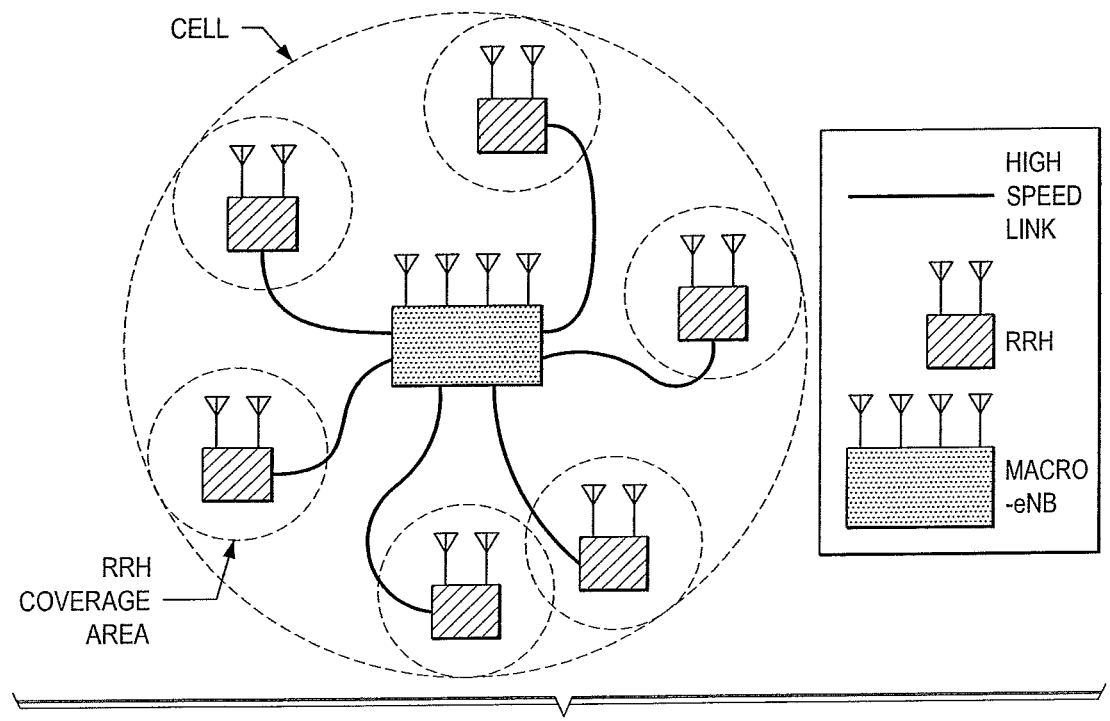
FIG. 1 shows a block diagram of one embodiment of a wireless network having a Remote Radio Head (RRH) deployment.

An apparatus and method are provided for feedback solutions that function in conjunction with CoMP transmissions. The feedback solutions are applicable to joint transmission (JT) as well as coordinated scheduling (CS) and coordinated beamforming (CB). Embodiments of the present disclosure are described herein in the context of a wireless network in compliance with LTE standards, including, but not limited to, Releases 8, 9, and 10. However, a skilled artisan will appreciate that the embodiments can be adapted for networks of other wireless standards.

More specifically, in one embodiment, the feedback solution can include per Transmission Point (TP) Precoding Matrix Indicator (PMI), per TP Rank Indicator (RI) and per TP and per codeword Channel Quality Indicator (CQI) feedback as well as per codeword joint CQI feedback. A TP here could refer to an eNB (node B), a low power node (LPN) or remote radio head (RRH). In this embodiment, for each configured sub-band or for a whole (wideband) system bandwidth, a UE feeds back: one PMI and one RI for each TP configured, and one non-JT CQI for each TP and each codeword (derived assuming DL data transmission from the individual TP with the corresponding PMI and RI), and/or one JT CQI for each codeword (derived assuming joint transmission from all the configured TPs with the fed-back PMIs and RIs), where the number of codewords is determined by the maximum number of data layers across all the TPs. In the case of joint transmission, layers precoded at and transmitted from a TP i, indexed by $S_i$, (i=0, 1, ..., $N_{TP}$−1) where $N_{TP}$ is the number of TPs in a CoMP set configured for the UE, may be predefined such that both the eNB and the UE know how to derive $S_i$ from reported RIs, configured by the eNB either dynamically (e.g., via PDCCH) or semi-statically (e.g., via RRC signalling) so that a UE knows the layer assignment for joint CQI calculation, or derived at the UE and signalled to the eNB.

In another embodiment, the feedback solution can include per TP PMI, per TP RI, per TP and per codeword CQI feedback and per TP Phase feedback as well as per codeword joint CQI feedback. This embodiment is similar to the first embodiment except that a relative phase offset term for each TP is also fed back and the common (JT) CQI that is fed-back is derived assuming that the relative phase offsets are corrected by the participating TPs. Thus, for each configured sub-band or for the whole (wideband) system bandwidth, a UE calculates and feeds back: a PMI and an RI per TP assuming joint transmission, and a relative phase offset term per TP per data layer assuming a common reference point such that the precoded signals from all the TPs with the feedback PMIs would be constructively added at the UE receiver, and a non-JT CQI per codeword per TP assuming non-joint (per TP) data transmission with the feedback PMI and RI, and/or a common CQI per codeword assuming joint transmission with the fed back PMIs, RIs and correction for the relative phase offset terms, where the number of codewords is determined by the maximum number of data layers across all the TPs. Layer mapping in each TP in the case of joint transmission may be: predefined such that both the eNB and the UE know how to derive $S_i$ from RIs and probably other channel state information (CSI), configured by eNB either dynamically (e.g. via PDCCH) or semi-statically (e.g. via RRC signalling) so that a UE knows the layer assignment for joint CQI calculation, and/or derived at the UE and signalled from UE to eNB.

In another embodiment, the feedback solution can include per TP PMI and per TP CQI feedback as well as joint CQI feedback where a UE feeds back a single common RI for all TPs instead of per TP RI.

In another embodiment, the feedback solution can include per TP PMI, per TP RI, and per TP CQI feedback for all the TPs in a CoMP set and joint CQI feedback for partial TPs in the CoMP set. This embodiment is similar to the second and third embodiments except that a UE may indicate to the eNB that some of the TPs in the CoMP set may not be good for joint transmission and are excluded from the CQI calculation for joint transmission. One of the following methods can be used: use per TP CQI=0, which is already defined in the specification, add a state corresponding to no transmission, e.g., rank=0, to the rank index table and send that index as the per TP RI, and/or add an all zero entry to each of the codebooks and feedback the per TP RI corresponding to rank=0 and/or the per TP PMI corresponding to all zero entry in a codebook when this situation occurs.

In another embodiment, the feedback solution can include independent per TP sub-band PMI, RI and/or CQI feedback. These CSI parameters are calculated assuming single-point transmission from the corresponding TP on that sub-band. A UE may feedback PMI/RI/CQI for a subset of the sub-bands, where the subset may be the same or different for each TP. Some examples of subset selection methods include: for each sub-band the CSI of a TP providing the highest throughput is reported, for each TP, the CSI of a certain number of sub-bands is reported. These sub-bands could include those with good enough channel conditions or simply the best M sub-bands, where M is pre-defined and known by both transmitter and the receiver.

An apparatus and method are also provided for transmission schemes for utilizing feedback solutions that functions in conjunction with CoMP transmissions.

More specifically, in one embodiment the transmission schemes for enabling feedback solutions can provide for joint transmission over the same sub-bands from multiple TPs with the same codewords. In this embodiment, TPs transmit the same data layers to a UE on the same time/frequency resources. Each data layer is precoded at each TP using a precoding vector that is part of a precoding matrix corresponding to the fed-back PMI from the UE. Each data layer k, on TP i may be multiplied by $e^{j\phi_{ik}}$, where $\phi_{ik}$ is a phase value that is either fed back from the UE or is set as zero otherwise. If the channel's rank from a TP is smaller than the total number of data layers transmitted to the UE, a subset of data layers are transmitted by the TP. The subset is assumed to be known by both the eNB controlling the TP and the UE. The layer indices could be signalled to the UE through either RRC or PDCCH In another embodiment, the transmission scheme for feedback solutions can provide joint transmission over the same sub-bands from multiple TPs with different codewords. In this embodiment, different data layers may be transmitted from different TPs on the same time/frequency resources and to the same UE. The data layers transmitted from one TP may be associated with codewords that are different from the codewords transmitted on other TPs, namely TP-specific codewords. Hence, more than two codewords may be sent to the same UE on a single radio carrier. Additionally, a TP may be assigned a rank=0 transmission, i.e., no data transmission at all from the TP. This assignment is signalled to the UE.

In another embodiment, the transmission scheme for enabling feedback solutions can provide transmit diversity across TPs. In this embodiment, when two TPs are involved in a joint data transmission to a UE, the two TPs can be considered as two or four virtual antenna ports after precoding with their corresponding precoding matrix indicated by the feedback PMI. In the case of rank 1 transmission, a single codeword is encoded by Alamouti (such as Space-Frequency Block Coding (SFBC)) coding to generate two layers, each is transmitted from one TP after undergoing separate precoding at each TP. In the case of rank 2 transmission with two codewords, each codeword is encoded by Alamouti (SFBC) coding to generate two layers, each is transmitted from one TP after undergoing separate precoding at each TP. Alternatively, when two TPs each have either one or two antennas, the release 8 2-port or 4-port Tx diversity scheme is used over the two TPs without precoding. In this alternative, TP specific RS ports is defined or UE-specific reference signal (DM-RS) ports as defined in releases 9 and 10 are reused for channel estimation for demodulation.

In another embodiment, the transmission scheme for enabling feedback solutions can provide open-loop spatial multiplexing CoMP transmission. In this embodiment, open-loop transmission is applied across the antenna ports of multiple TPs. Each TP transmits the same or a different data stream and no PMI feedback is required. When each TP has more than one antenna port, open-loop precoding is performed at each TP. The precoding vectors or matrices at each TP are predefined and thus no PMI feedback is required. In this embodiment, DM-RS may be used for data transmission, and the UEs do not need to know the precoding vectors or matrices.

In another embodiment, the transmission scheme for utilizing feedback solutions can provide joint data transmission over different sub-bands from multiple TPs. In this embodiment, joint data transmission is performed on separate (non-overlapping) sub-bands from multiple TPs with at least one of the following options: Different TPs transmit different segments of a codeword on separate sub-bands with single MCS across separate sub-band, or different TPs use the output of the same channel forward error correction encoder and apply rate matching separately to achieve different MCS across separate sub-bands, then, each TP transmits its portion of the codeword on a separate sub-band from other TPs, or each TP has a separate TB on which it applies channel coding, the codewords of different TPs are then transmitted on separate sub-bands.

An apparatus and method are also provided for configuring feedback and transmission schemes that function in conjunction with CoMP transmissions.

More specifically, in one embodiment the configuring feedback and transmission schemes that function in conjunction with CoMP transmissions provides for configuration of feedback modes of operation. In certain embodiments, the solutions for configuring a feedback reporting mode for a closed loop CoMP transmission includes supporting feedback of common rank (i.e., one rank for all TP) or separate rank for each TP (the separate rank for each TP may be jointly coded and fed-back together in the same rank report (RI)). In certain embodiments, for each TP, a separate CQI/PMI reports as defined in release 8 to release 10 is fed back to the eNB, the CQI feedback in such reports assumes a single TP transmission and is derived the same way as defined in previous releases. In certain embodiments, the CQI/PMI reports for each TP are transmitted in either PUCCH or PUSCH. If transmitted in PUCCH (e.g., as a periodic report), different reports for different TP are transmitted in different subframes in a Time Division Multiplexed (TDM) manner. If transmitted in PUSCH (e.g., as an aperiodic report), all reports for different TP are multiplexed together. In certain embodiments, in addition to the above reports, CQI reports are configured which feedback a jointly derived CQI for each codeword assuming that the same layers of data are transmitted from each TP. Such reports are transmitted on PUCCH as periodic reporting and multiplexed with other CQI/PMI reports in TDM manner or multiplexed with other CQI/PMI reports and transmitted on PUSCH as aperiodic reporting.

More specifically, the solutions for configuring a feedback mode for a closed loop CoMP transmission includes extending feedback on PUCCH and/or PUSCH for closed-loop transmission via the release 8 feedback modes 1-1, 2-1 for PUCCH, and modes 3-1, 1-2 and 2-2 for PUSCH. In these modes, for each TP, the same types of feedback reports as defined in release 8 are used. Additionally, joint CQI reports are derived and fed-back. In certain embodiments, for selected sub-band reporting, the selection of the best-M sub-bands is based on joint CQI from multiple TPs rather than individual CQI for each TP. In these embodiments, the UE then derives and feeds back separate CQI/PMI reporting for each TP based on selected sub-bands and assumes individual transmission from each TP. In certain of these embodiments, the UE could in addition derive and feedback joint CQIs for each selected sub-band by assuming joint transmission from all participating TPs.

In another embodiment, the configuring feedback and transmission schemes that function in conjunction with CoMP transmissions provide for configuration of transmission modes of operation. In certain embodiments, the solutions for configuring a transmission mode for a CoMP transmission include configuring a closed-loop spatial multiplexing CoMP transmission mode. The transmission mode supports separate CQI/PMI reporting for each TP. In addition, a joint CQI feedback is configured. Dynamic switching between CoMP and non-CoMP transmission is supported by this mode of operation. In certain embodiments, configuring an open-loop spatial multiplexing CoMP transmission mode, which does not need PMI feedback from the UE. In this embodiment, optionally, pre-defined or eNB determined precoding vectors are applied at the TPs. In certain embodiments, Configuring both closed-loop and open-loop spatial multiplexing CoMP transmissions is included in one transmission mode (i.e., a Spatial multiplexing CoMP transmission mode). Which transmission (i.e., closed-loop or open-loop) is in effect is made to be transparent to the UE. The UE needs only be configured with different feedback modes to achieve the switch between them. For example, if the UE is configured with CQI only (no PMI) feedback, open-loop transmission is used, while if the UE is configured with PMI/CQI feedback, closed-loop transmission is used. In certain embodiments, transmit diversity with or without precoding is configured for two TPs. Alamouti types of encoding are applied to generate pairs of coded symbols which are transmitted from each TP. CQI calculation at the UE for feedback assumes that Alamouti coding is used.

An apparatus and method are also provided for a CSI-RS solution that functions in conjunction with CoMP transmissions. This solution considers a method of CSI-RS multiplexing in a cell with a macro-eNB and multiple low power nodes (LPNs) sharing the same cell ID. Two CSI-RS configurations can be used, one for the macro-eNB and the other for all the LPNs. Each LPN transmits the CSI-RS over different sub-bands and the system bandwidth or bandwidth of operation is covered by CSI-RS from all the LPNs. The sub-band on which CSI-RS is transmitted for each LPN hops across the whole system bandwidth over time. The hopping pattern of CRS-RS for each LPN could follow the same cycle but with different sub-band offset. The CSI-RS for the macro-eNB is transmitted separately across the whole system bandwidth.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

In a network of LTE standards, CSI Reference Signals (CSI-RS) can be transmitted in certain subframes as a reference signal. Assuming the Channel State Information-Reference Signal (CSI-RS) is designed such that a UE can measure the channel of a macro-eNB and each Remote Radio Head (RRH) separately, it is desirable to enable efficient transmission schemes. In such transmission schemes, it is desirable to avoid excessive feedback overhead. Also, it is helpful to reuse the components or structure of the existing feedback mechanisms as much as possible to minimize the impacts to both the system and the UE. For example, a Precoding Matrix Indicator (PMI) (which is used by the UE to feedback to the eNB its preferred precoding vector or matrix) may be confined to be selected from existing codebooks. Accordingly, it is desirable to provide a feedback mechanism that functions in conjunction with CoMP transmission methods.

Additionally, the performance of a CoMP operation strongly depends on the transmission scheme. Hence, it is important to coordinate signal processing at different Transmission Points (TPs) to form an efficient transmission that can utilize the benefits of CoMP. This coordination can be in the form of coordinated beamforming (CB) and/or coordinated scheduling (CS), where each UE can receive data only from a single TP at a time; however, the PMI and/or time/frequency resources are coordinated between the nodes in the CoMP set to minimize or avoid interference caused to other UEs. An alternative method of coordination could be realized through joint transmission (JT), where the UE receives data from multiple TPs at the same time.

In release 10 of the 3GPP specification, CSI-RS was introduced for the UE to measure CSI for a downlink transmission. The signalling overheads of CSI-RS from the eNB to the UE increase as the number of transmit antennas involved in the Multiple Input and Multiple Output (MIMO) transmission is increased. To control this signalling overhead and yet support up to 8-tx transmission, CSI-RS are not transmitted in every subframe and thus the CSI-RS are more sparse in the time domain compared with Rel-8 common (or cell-specific) RS (CRS). In release 10, each UE is required to measure and report CSI based on a single CSI-RS configuration. In release 11 of the 3GPP specification study phase of CoMP scenario 4, all the low power nodes (LPNs) such as RRHs within a macro-cell coverage area and the macro eNB itself share the same cell ID. In this case, the UE may not be informed directly of the presence of the RRHs, but only with the CSI-RS ports associated with each RRH. Because the number of RRHs in a cell could be relatively large, it is desirable that the CSI-RS design and configuration be simple and flexible. It is also desirable that the CSI-RS design and configuration be transparent to release 10 type UEs for backwards compatibility purposes. It is also desirable that the complexity increase at the UE be kept low.

In a system deploying CoMP operation, a set of transmission/reception nodes that cooperate with each other to serve one or multiple UEs form a CoMP set. The nodes in a CoMP set may be eNBs and/or low power nodes (LPNs) such as remote radio heads (RRHs). The LPNs can include, but are not limited to, a microcell, a picocell, a femtocell, and the like.

FIG. 1 shows an example of a CoMP deployment with one macro-eNB and six RRHs, where the macro-eNB is located at the center of a cell while the six RRHs are located at the cell edge. The nodes in a CoMP set are assumed to be connected through backhaul, e.g. by optical fibre.

The cooperating nodes can send and receive either digitized baseband signals or radio frequency (RF) signals through the backhaul connections. In some implementations, instead of point to point connections between all nodes, the nodes can be all connected to a single central entity. This central entity can be, for example, an eNB or a central processing center. For exemplative purposes, the backhaul connections are characterized by zero latency and infinite capacity. To simplify discussion, a RRH or the macro-eNB are also referred to as a transmission point (TP).

Four different deployment scenarios have been defined for the study of CoMP. These four scenarios are categorized into homogeneous and heterogeneous deployments. More specifically, for homogeneous deployments, a first scenario describes a homogeneous network with intra-site CoMP and a second scenario describes homogeneous network with high Tx power RRHs (inter-site CoMP). For heterogeneous deployments, a third scenario describes a heterogeneous network with low power RRHs within the macrocell coverage where the transmission/reception points created by the RRHs have cell IDs different from the macro cell. A fourth scenario describes a heterogeneous network with low power RRHs within the macrocell coverage where the transmission/reception points created by the RRHs have the same cell IDs as the macro cell.

Figure 2:
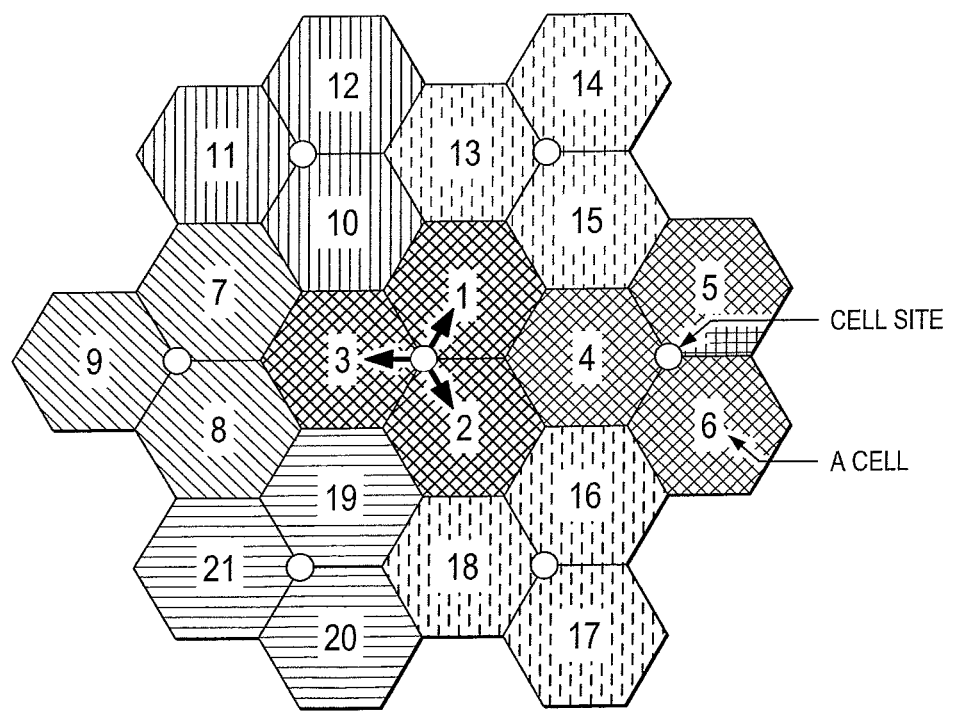
FIG. 2 shows a block diagram of one embodiment of a wireless network having a homogeneous network deployment.

In a homogeneous network deployment, macro-cells are generally formed by placing eNBs uniformly in a geographical area. Each of the cells is served by an eNB with the same or similar transmit power and thus has the same or similar size. An example is shown in FIG. 2, where total of 21 cells are deployed with six cell sites. Each site includes three eNBs, one for each cell. Cell tower is normally deployed in each site to provide a large coverage area and high transmit power is typically used.

While in a heterogeneous deployment, low power nodes are placed throughout a macro-cell layout. An example is shown in FIG. 1, where the RRHs could be low power nodes.

The described embodiments in this application apply to all these four scenarios unless otherwise specified. Also, the described embodiments are based on an LTE system, although the concepts are equally applicable to other wireless systems as well.

To enable coherent reception of downlink data signals and to facilitate measurements which may be used to enable modulation and coding rate assignment, systems such as LTE utilise reference signals (RS) which are transmitted by the eNB in addition to the data signals. In MIMO systems, different RS may be transmitted from different transmit antennas. Receivers in the system (such as a UE) commonly process the received RS to determine Channel State Information (CSI) for a given moment in time. CSI may be obtained for multiple transmit/receive antenna pairs (i.e., the individual channels that collectively constitute a MIMO channel). The CSI information obtained by the receiver is used to enable or improve reception of the downlink data signals.

Different types of RS are defined in the LTE system. More specifically, Cell-Specific (Common) Reference Signals (CRS) are RS that are regularly transmitted throughout the cell and which are available to all UEs. CRS are not precoded, hence if a precoded data signal is transmitted to a UE, the UE receiver requires knowledge of both the CSI (obtained from the non-precoded CRS) and the precoding vector or matrix that was employed at the eNB, to form an estimate of the composite (precoded) channel through which the data signal has passed (this being necessary to correctly demodulate the data signal). This is commonly referred to as codebook-based precoding, as the selected precoding vector or matrix typically is one from a predefined set of possible precoding vectors or matrices (a codebook). Antenna ports 0 to 3 use CRS in the LTE system. Additionally, UE-Specific (Dedicated) Reference Signals (DRS) are RS that are embedded along with data intended for a specific recipient UE. DRS are generally precoded using the same precoding vector or matrix as is applied to the data signal (the precoding is usually arranged to optimise a quality of reception at the intended UE). Hence, the UE receiver does not require knowledge of the precoding vector or matrix that has been applied at the transmitter —rather it simply determines a composite CSI (including the effects of both the precoding and the propagation channel)

from DRS and uses this composite CSI to demodulate the precoded data signal. Antenna ports 5, and 7 through 14 use DRS in the LTE system.

Additionally, CSI Reference Signals (CSI-RS) are RS that are transmitted in certain preconfigured subframes and are intended for all Rel-10 UEs in a cell. CSI-RS are similar to CRS except that: they are used for CSI estimation only for a Rel-10 UE and are not used for data demodulation at a UE, they are not transmitted on every subframe, and there are multiple configuration options available, the configuration of CSI-RS in a cell is independent of the cell ID.

Figure 3:
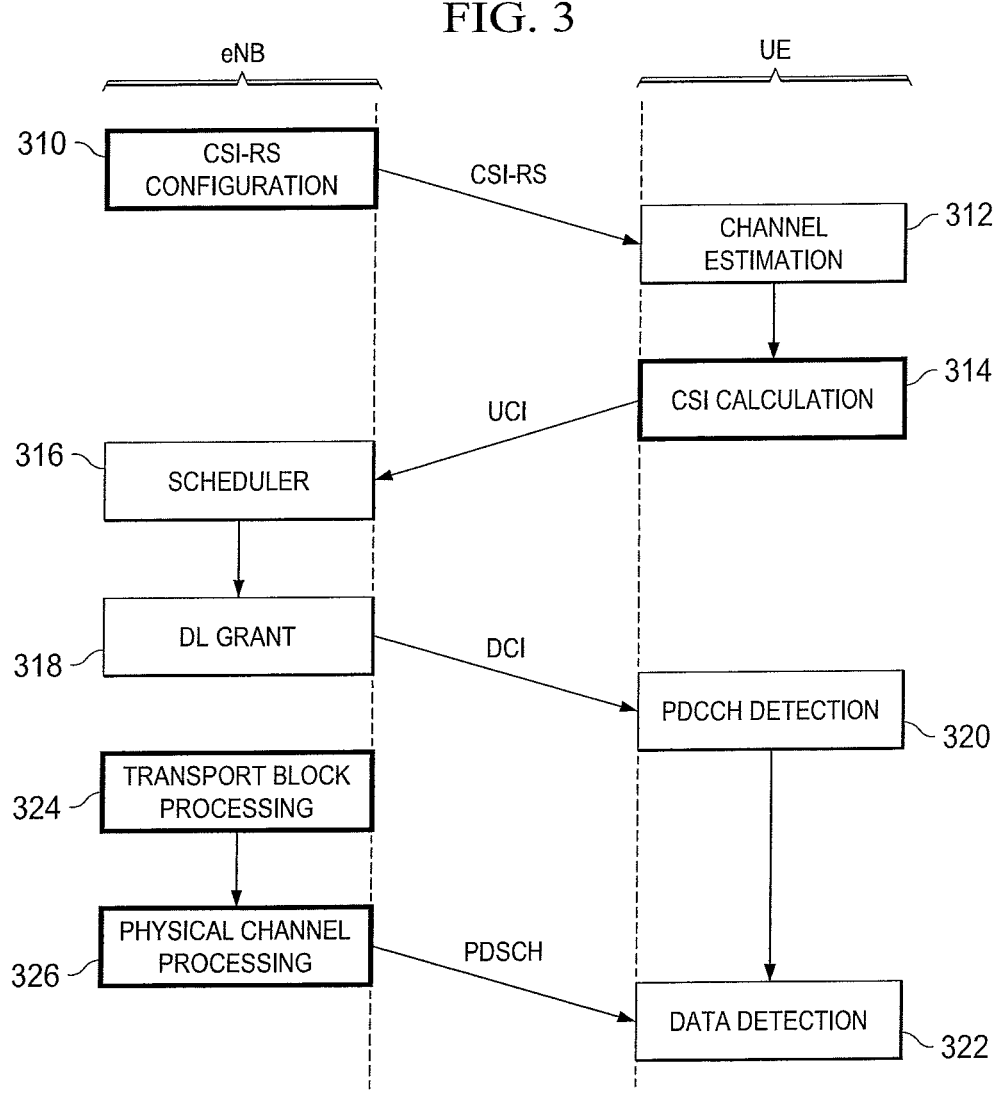
FIG. 3 shows a block diagram of procedures for downlink data transmission between an eNB and a UE according to one embodiment.

An example of a transmission scheme utilising CSI-RS is shown in FIG. 3. The figure shows a simplified block diagram of eNB-UE procedures for dynamic DL data scheduling and transmission in LTE-A (Rel-10) using transmission mode 9 (TM 9). DL data transmission in other transmission modes would be similar. In LTE, 9 DL transmission modes have been defined, and each supports certain transmission schemes such as single antenna transmission, multiple antenna transmission with transmit diversity, open-loop or closed-loop MIMO, multi-user MIMO (MU-MIMO), etc. A complete list of DL transmission modes in LTE is shown in Table 1 below. TM1 to TM7 are defined in Rel-8. TM8 was introduced in Rel-9 to support DL dual layer beamforming, and TM9 was introduced in Rel-10 to support up to eight layers of MIMO transmission with up to eight transmit antennas.

transmission schemes such as single-cell single and multi-user MIMO, as well as coordinated multi-cell transmission.

Figure 4A:
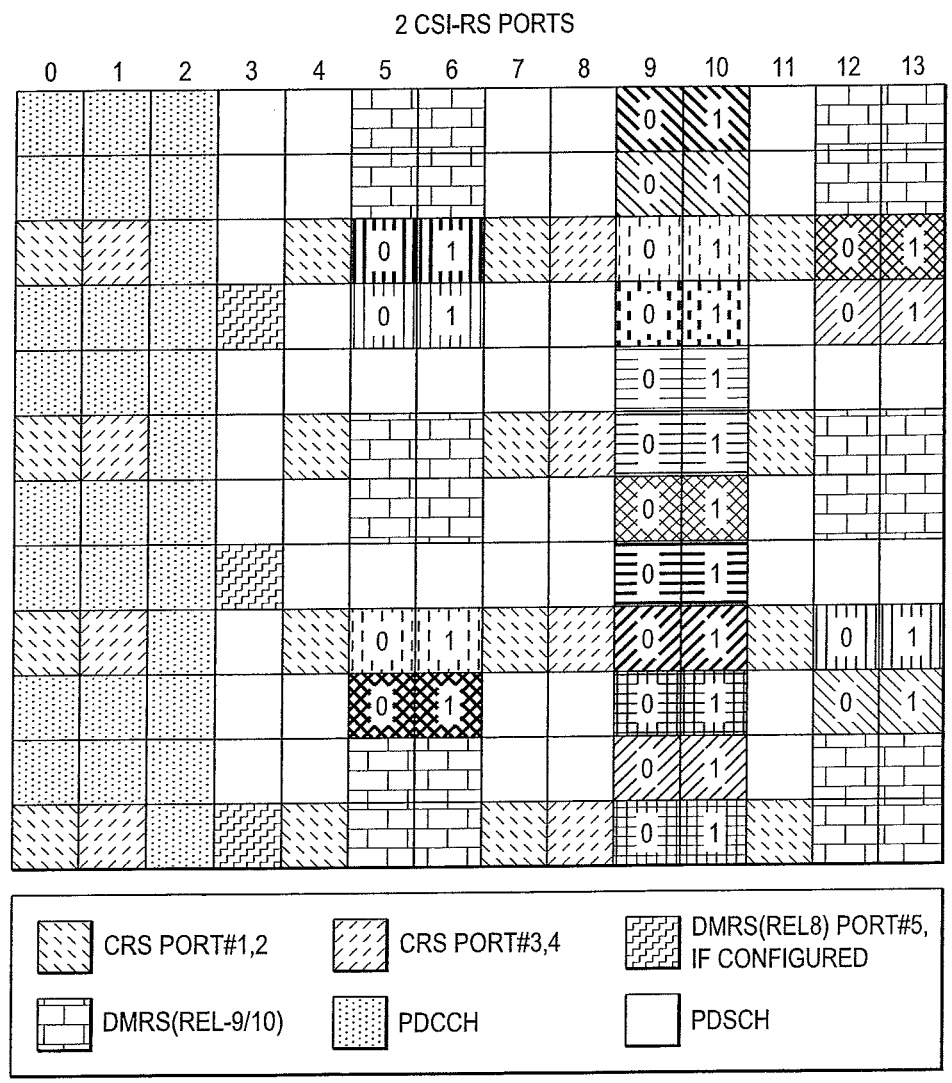
FIGS. 4A-4C show block diagrams of CSI-RS pattern examples.
Figure 4B:
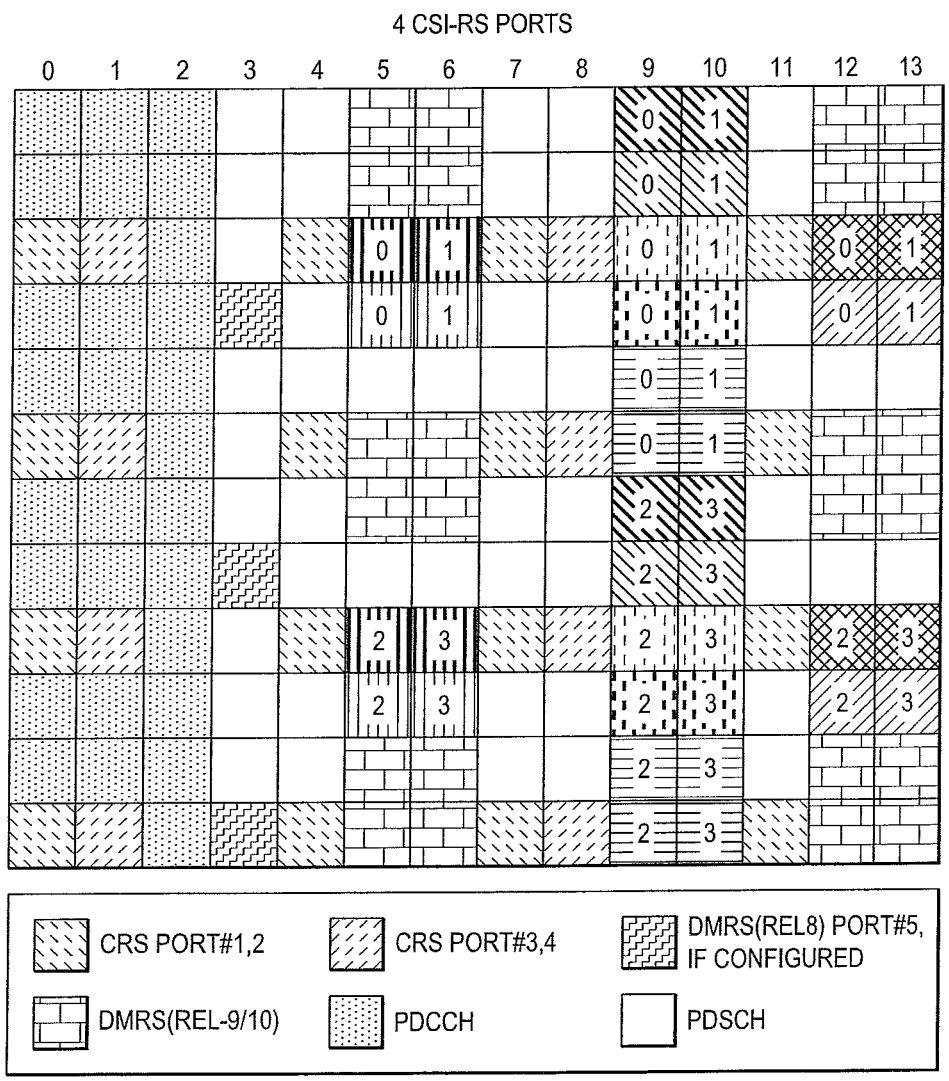
Figure 4C:
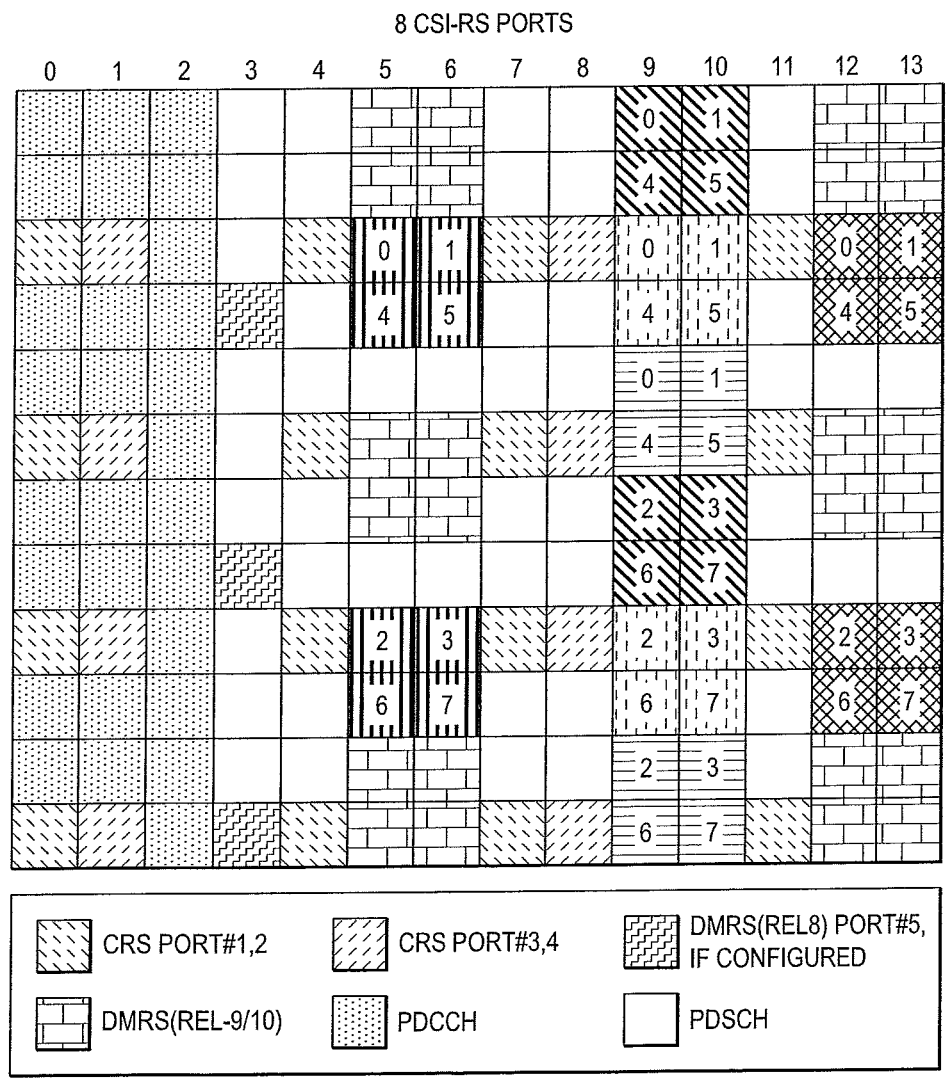

The configuration of CSI-RS is cell specific and includes parameters that define the pattern, periodicity, subframe offset, and number of CSI-RS ports. CSI-RS patterns adopt a base pattern with length-2 time domain Orthogonal Cover Codes (OCC) for each pair of antenna ports. The patterns have a nested structure, where the pattern used for a smaller number of CSI-RS ports is a subset of the pattern used for a larger number of CSI-RS ports. Multiple patterns/configurations are available for the network to provide varying pattern reuse factor across cells or TPs. The configuration parameters of CSI-RS are explicitly signalled via higher layers (via Radio Resource Control—RRC—signalling) within each cell. An example of a CSI-RS configuration for the normal cyclic prefix (CP) duration is shown in FIG. 4.

Next, a Channel Estimation step 312 is performed. Based on the received signal on the CSI-RS resources, the UE estimates the DL channel on the corresponding resource elements.

Next, a CSI Calculation step 314 is performed. The UE measures and reports channel state information (CSI) to the eNB for efficient data transmission. The CSI feedback may include parameters such as a channel quality indicator (CQI), a precoding matrix indicator (PMI), a precoding type indica-

TABLE 1

DL transmission modes and supported DL transmission schemes for dynamically scheduled UE specific PDSCH data in LTE

| Transmission mode | Supported DL transmission scheme | Rel-8 | Rel-9 | Rel-10 | RS for DL CSI measurement | RS for PDSCH demodulation |
|---|---|---|---|---|---|---|
| Mode 1 | Single antenna, port 0 | yes | Yes | yes | CRS | CRS |
| Mode 2 | Transmit diversity | yes | Yes | yes | | |
| Mode 3 | Open-loop MIMO | yes | Yes | yes | | |
| | Transmit diversity | yes | Yes | yes | | |
| Mode 4 | Closed-loop MIMO | yes | Yes | yes | | |
| | Transmit diversity | yes | Yes | yes | | |
| Mode 5 | MU-MIMO | yes | Yes | yes | | |
| | Transmit diversity | yes | Yes | yes | | |
| Mode 6 | Closed-loop MIMO with a single transmission layer | yes | Yes | yes | | |
| | Transmit diversity | yes | Yes | yes | | |
| Mode 7 | Single layer beamforming | yes | Yes | yes | CRS | DRS |
| | Transmit diversity or single antenna port | yes | Yes | yes | CRS | CRS |
| Mode 8 | Dual layer beamforming | | Yes | yes | CRS | DRS |
| | Transmit diversity or single antenna port | | Yes | yes | CRS | CRS |
| Mode 9 | Up to 8 layer closed-loop MIMO transmission | | | yes | CSI-RS | DRS |
| | Transmit diversity or single antenna port transmission | | | yes | CSI-RS | CRS |

As shown in FIG. 3, a plurality of steps can be performed by the eNB and the UE. More specifically, a CSI-RS Configuration step 310 is performed. In release 10, a set of RS, namely CSI-RS symbols, are defined. CSI-RS are used for channel measurements and for deriving feedback on the quality and spatial properties of the channel(s) as needed. It is expected that CSI-RS will be the main reference signals used for CoMP operation in subsequent releases of LTE. The feedback derived by the UE from CSI-RS can be used for different tor (PTI), and a rank indication (RI). Depending on the feedback mode, all or some of these parameters are included in CSI feedback.

CSI feedback could be wideband or sub-band. In wideband CSI feedback, a single value of each CSI parameter is calculated and reported for the whole bandwidth. In sub-band CSI, the whole bandwidth of the carrier is divided into sub-bands (with a configurable size) and for each sub-band a set of CSI parameters is calculated and reported to the eNB.

The CSI feedback parameters derived by the UE can form part of the uplink control information (UCI) that is transmitted by the UE on either a physical uplink control channel (PUCCH) or a physical uplink shared channel (PUSCH).

Next, a scheduler step 316 and a DL grant step 318 are performed. The scheduler decides which time/frequency resources of a Physical Downlink Shared Channel (PDSCH) are assigned for DL transmission to the UE. The time/frequency resources are expressed in terms of the assigned Resource Blocks (RB), with one RB comprising 12 sub-carriers of frequency resource during one 0.5 ms slot of time resource. This assignment information along with other transmission parameters, form the DL grant are transmitted as downlink control information (DCI) on the physical downlink control channel (PDCCH) to the UE at step 320. This information is detected and recorded by the UE, and used for detection of the data sent on PDSCH at step 322.

Next, a transport block processing step 324 is performed. Data arrives from a higher layer in the form of transport blocks (TBs). In current releases of LTE, a maximum of two TBs are transmitted in each transmission time interval (TTI). Each TB is encoded into a codeword in a few steps as shown in FIG. 5. First, a Cyclic Redundancy Check field (CRC) is attached to the TB. If the size of the TB is larger than a certain value, code block segmentation is applied to divide the TB into smaller blocks termed code blocks. Channel coding is applied on each code block separately. Rate matching is applied based on the modulation and coding scheme (MCS) assigned to the UE. Finally, the rate matched coded bits are concatenated to form a codeword.

Figure 6:
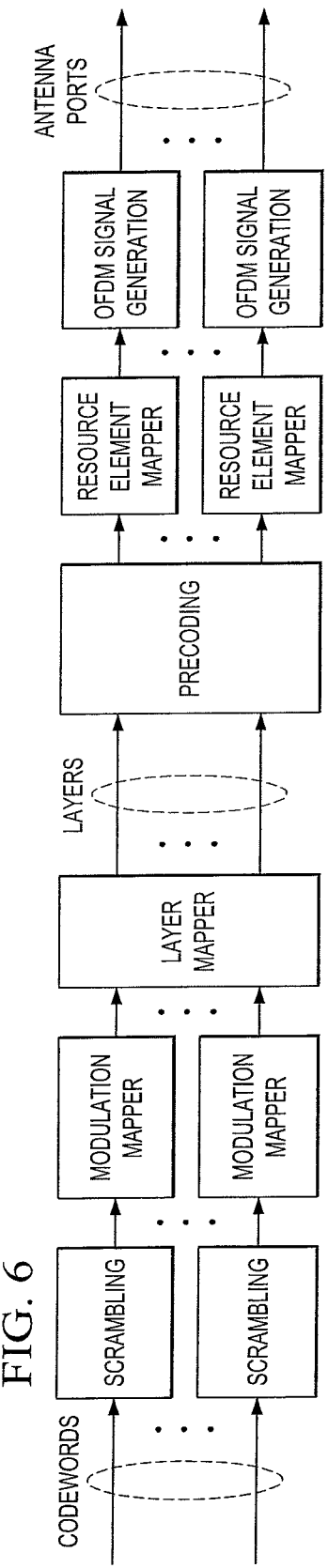
FIG. 6 shows a schematic block diagram of the physical layer of a wireless device for physical channel processing according to one embodiment.

Next, a physical channel processing step 326 is performed. The codeword formed by the coding unit is converted into OFDM symbols to be transmitted on the DL channel. FIG. 6 shows the steps involved in this process. Each codeword is first scrambled by a cell-specific scrambling sequence. The scrambled bits are then modulated to form modulation symbols. The modulation symbols from all codewords are mapped to layers, where the number of layers (or transmit rank) is indicated in the DL grant carried in the PDCCH. Subsequently, the precoding is applied to the data layers to form the signals for each antenna port. The output of the precoder is mapped to resource elements in the frequency domain and then the OFDM signal in time domain is generated and transmitted over each antenna port. A Resource Element (RE) is a minimum unit of time/frequency resource, defined in the LTE system as one OFDM symbol duration in time and one sub-carrier in frequency.

The block diagram of FIG. 3 describes the procedures for downlink data transmission in a non-CoMP transmission. For CoMP transmission, some of these procedural components may need to be modified to fully utilize the potential of cooperative communications.

There are a plurality of feedback and transmission methods for multi-point operation. One such method feeds back a joint CSI. In this method, multiple TPs are considered together as a virtual single TP. Denoting the channel matrix from TP i to the UE by $H_i$, the composite channel from this virtual single TP to the UE is equal to $$H_c = [H_1 \ldots H_n].$$

Based on $H_c$, one set of CSI (e.g., PMI, CQI, and RI) are calculated and fed back to the eNB. This scenario is suited for joint transmission (JT) of the same data from all cooperating TPs. A benefit of this method is that the same feedback modes as used in current/legacy systems can be reused, yet the advantages of multiple point transmission can still be utilized.

One issue of this feedback method is that the existing codebooks are only designed for up to eight antenna ports, therefore, if the total number of antenna ports from all the TPs involved in a JT is larger than eight, a new codebook may be required. Another issue is that the transmit power of the multiple TPs, and consequently the signal strengths received from them at the UE side, may not be the same, whereas known codebooks are designed assuming the same power level for all antenna ports. Hence, known codebooks may not be efficient for use in joint transmission in heterogeneous networks where the transmit powers from each TP may not be the same, thus a new design may be desirable. Another issue is that known codebooks are often designed assuming that all antennas are co-located on the same TP and therefore close to each other; with more distributed antennas on different TP, the codebook may need to be modified to accommodate different antenna correlations.

Another method feeds back separate rank-1 PMI, common CQI and inter-TP phase information. This method feeds back separate rank-1 PMIs for each TP and allows the TPs to each transmit the same data using their own PMI (and using a common CQI). With this method, each TP can individually apply beamforming to the data it transmits; however, due to uncontrolled phase differences between TPs, the signals from the different TPs may add with random phases, thus limiting an overall beamforming gain. One solution to this issue is to feedback some phase information about channels from each of the TPs and to utilize such information at the TPs during beamforming operation in an attempt to achieve constructive phase alignment at the UE, thereby helping to achieve higher overall beamforming gains.

In certain known methods, this phase feedback method for rank-1 transmission is used with two TPs. The PMI for each TP is obtained from its channel matrix and a phase difference θ is calculated such that when the transmission phase at TP#2 is compensated by this value, the received signals from both TPs add coherently at the UE side. In mathematical notation, this transmission method is described as $$y = (H_{11} w + e^{j\theta} H_{21} w_2) x + n$$

where y denotes the received signal vector at the UE's receive antennas, $H_{11}$ and $H_{21}$ represent the channel matrices between TPs 1 and 2 and the UE respectively, $w_1$ and $w_2$ represent the precoding vectors applied at TPs 1 and 2 respectively, and n is a vector of additive thermal noise at the UE's receiver.

In another solution as opposed to the individual (per-TP) PMI calculations, the PMI calculation is carried out jointly. In this joint calculation approach, the PMIs are assumed to be sub-vectors of a single precoding vector calculated based on the composite channel $H_c$, other words, denoting the right singular vector of $H_c$ by v, then v is quantized as $$Q(v) = [\alpha_1 p_1^T \alpha_2 e^{j\theta_2} p_2^T \ldots \alpha_n e^{j\theta_n} p_n^T]^T,$$

where Q(.) indicates the quantization operation; $p_i$ (i=1, 2, ..., n) is a $m_i \times 1$ ($m_i$=1,2,4,8) precoding vector for TP i chosen from a codebook for $m_i$ antenna ports and $m_i$ is the number of Tx antennas at TP i; $\alpha_i$ and $\theta_i$ are the channel amplitude and phase values associated with TP i. Because of the additional amplitude information and also joint calculation of PMIs, more gain is expected with this approach when compared with the individual PMI calculation method.

One issue of the aforementioned methods however is that whilst both work for rank-1 transmission, it is not clear how to feedback phase information for transmission ranks larger than one. Also, in the first method, if the number of receive antennas is larger than 1, it is not possible to choose the phase value θ such that the received signals add constructively on all receive antennas.

Another method feeds back separate per TP PMIs, RIs and CQIs which are jointly calculated. In this method, the UE feeds back PMI, RI, and CQI for each TP individually, and each TP transmits different data streams to the UE. The transmission can be described as $$y = \sum_i H_i W_i x_i + n$$

where y denotes the received signal vector at each of the UE's receive antennas, $H_i$ represents the channel matrix between the transmit antennas of the $i^{th}$ TP and the UE's receive antennas, $W_i$ represents the precoding matrix applied at the $i^{th}$ TP, $x_i$ is the data symbol transmitted from the $i^{th}$ TP and n is a vector of additive thermal noise at each receive antenna.

In this method, different data streams are transmitted from different TPs and a joint optimization is applied for selecting the per TP PMI, RI, and CQIs for all TPs to maximize the overall data throughput by taking into account the possible interference between different TPs.

Another method provides a CSI-RS design. From LTE Release 10 onwards, cell specific CSI-RS have been introduced for UEs to measure and feedback DL channel state information (CSI) from a single serving cell (i.e. the cell that is used for downlink transmission to the UE). A Rel-10 UE may be configured with multiple sets of CSI-RS configurations, one for the serving cell and others for other neighboring cells. The CSI-RS configuration for the serving cell is typically indicated as a non-zero transmission power CSI-RS configuration, while CSI-RS configurations for other cells are indicated as CSI-RS with zero transmission power and could be used by the UE to measure the channels from other cells (that is, the resource elements associated with some CSI-RS are left empty by the serving cell to facilitate improved reception of CSI-RS from other cells on those RE at the UE). In Rel-10, a UE only measures and feeds back DL CSI based on this non-zero transmission power CSI-RS.

When RRHs are deployed in a cell covered by a macro-eNB and when the RRHs share the same cell ID as the macro-eNB, a few options for CSI-RS configuration have been considered. In one scenario, the antennas of the RRHs are considered as part of the macro-eNB and thus a single CSI-RS configuration may be used where one CSI-RS port is assigned to each of the antenna ports. For example, assuming one macro-eNB and three RRHs are deployed in a cell sharing the same cell ID and each with two antenna ports, then an 8-port CSI-RS configuration defined in Rel-10 can be used in which one CSI-RS is assigned to each of the antenna ports. As shown in FIG. 7, the Rel-10 CSI-RS configuration #0 with 8 CSI-RS ports can be used.

This configuration however does not work when the total number of antenna ports (macro eNB+RRHs) exceeds eight because the maximum number of antenna ports supported in Rel-10 is eight.

Figure 8:
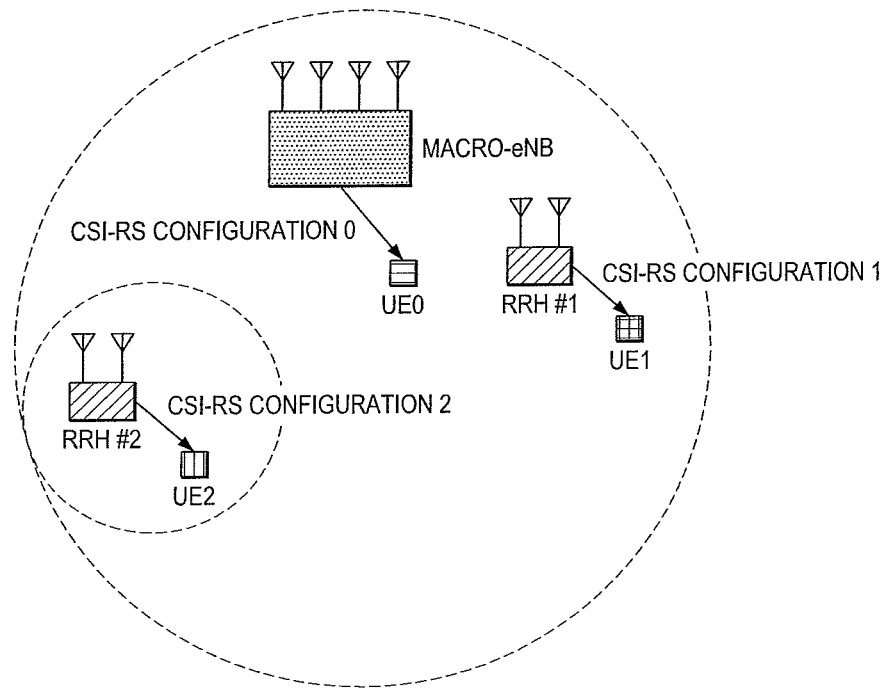
FIG. 8 shows a block diagram of an example of a TP specific CSI-RS configuration.

An alternative option is to have a separate CSI-RS configuration for each TP. An example is shown in FIG. 8. Since for each UE, CSI-RS configurations are signalled in a UE specific fashion in Rel-10, the eNB can configure each UE with a UE specific CSI-RS configuration(s) for channel estimation and CSI feedback. A UE sufficiently close to a TP would typically be configured with the CSI-RS assigned to that TP. Different UEs would thus potentially measure on different CSI-RS resources depending on the locations of the UEs within the coverage area spanned by the multiple TPs that share the same cell ID. However it should be noted that in Rel-10, a UE only measures and reports a single CSI-RS configuration with non-zero transmission power. For a UE to measure and report channel feedback for multiple TPs, some changes are required beyond Rel-10 to enable CSI feedback for multiple TPs. In this case, a large number of configurations may be needed to support a large number of TPs in a cell. Moreover the eNB needs to know which TPs cover the UE to assign the corresponding CSI-RS configurations to the UE. When a UE moves from the coverage area of one TP to the coverage area of another TP, a CSI-RS reconfiguration for the UE may be needed if the CSI-RS of a new TP is not yet configured for that UE.

Accordingly, in one embodiment, a feedback method can provide per Transmission Point (TP) Precoding Matrix Indicator (PMI), per TP Rank Indicator (RI) and per TP Channel Quality Indicator (CQI) feedback as well as joint CQI feedback.

In this method, the UE feeds back a PMI, an RI and one or more CQI(s) for each associated TP. The PMI and RI are calculated assuming joint data transmission from multiple TPs (as described below) or calculated separately for each TP assuming non-joint transmission, whereas the CQI or CQIs are calculated assuming data transmission from only the corresponding TP using the feedback PMI and RI for the TP. In addition, one or two joint CQI(s) are also fed-back, depending on whether the number of codewords is one or two, respectively. This feedback scheme is used for either per TP data transmission to a UE or joint transmission of the same layers of data from multiple TPs.

Figure 9:
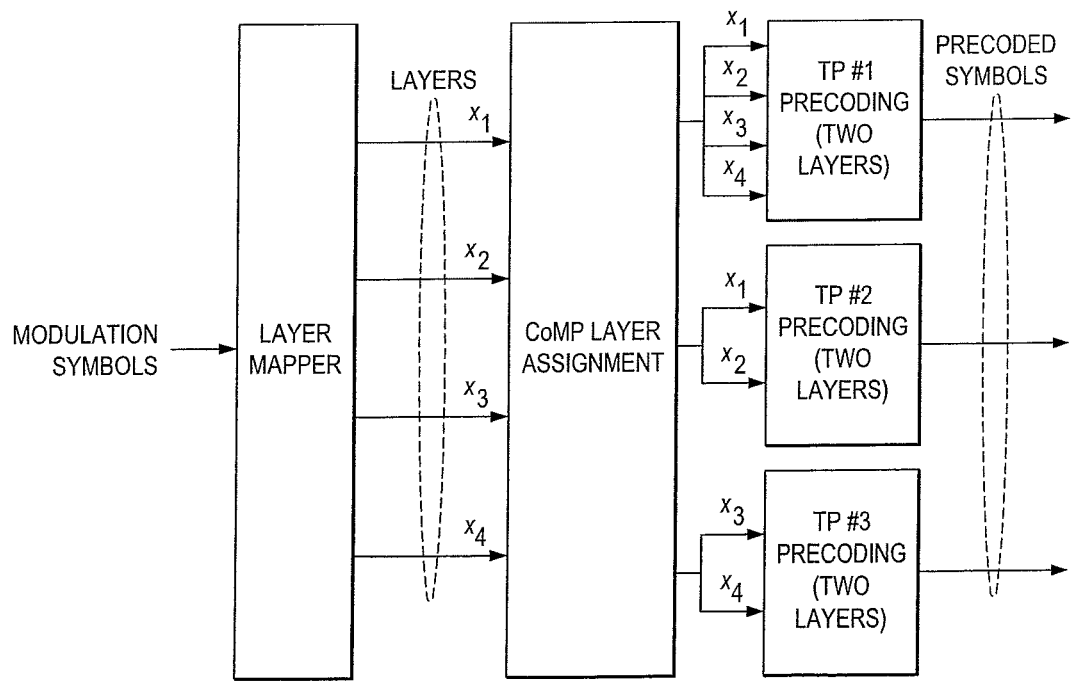
FIG. 9 shows a block diagram of an example of a joint transmission from multiple TPs with mixed ranks.

In the case of joint data transmission, if the transmission rank of all TPs is the same, say equal to R, all TPs transmit the same data vector x with length R. If the transmission ranks of various TPs are different, then TP i chooses $R_i$ data layers from x and transmits this sub-vector, where $R_i$ is the number of layers supported by TP i. An example of this mixed-rank transmission is shown in FIG. 9. In FIG. 9, four layers of data are to be transmitted using three TPs. TP#1 has four antenna ports, and TPs #2 and #3 each have two antenna ports. In this example, precoding at TP#1 is applied to all data layers $x_1$, $x_2$, $x_3$, $x_4$, whilst precoding at TP #2 is applied only to $x_1$, $x_2$, and precoding at TP #3 is applied only to $x_3$, $x_4$.

An index set $S_i$, where $S_i \subseteq \{1, \ldots, R\}$, $|S_i|=R_i$ is defined to denote the index of the layers precoded and transmitted by TP i. For more accurate CQI estimates at a UE, the UE should know the index sets used by all TPs. In various embodiments, a plurality of approaches are used to assure the UE and the TPs use the same $S_i$:

More specifically, in one approach, a pre-defined rule is used. With this approach, the index sets are determined from rank indices (which is known by the eNB and the UE via signalling) and based on a pre-defined rule agreed between the eNB and the UE. For example, the rule could be that each TP i with rank index $R_i$ chooses $S_i=\{1, \ldots, R\}$. Another example is to set a rule such that the layers are distributed on TPs as evenly as possible. For example, in FIG. 9 the assignment is done such that each data layer is transmitted exactly from two TPs.

The rule may be specified in a standard or may be selected from a few pre-defined sets and signalled semi-statically. Also, the rule may be based on some known cell attribute (such as cell ID) or a CoMP set index. In these approaches, there is no need for dynamic signalling of $S_i$ and no overhead is incurred (e.g. on the downlink or uplink control channel).

In another approach, an explicit signalling of $S_i$ is used. In this approach, the index sets are determined by the eNB and signalled either dynamically to the UE (e.g. as part of the DCI on PDCCH) or semi-statically (e.g. via RRC signalling). The eNB's selection of the $S_i$s may be based on CQIs and other uplink control information (UCI) or feedback received from the UE. This method imposes some overhead on downlink control channel.

In another approach, reporting $S_i$ on UCI and DCI is used. With this approach, the index sets are determined by the UE and reported as part of UCI to the eNB. Similar to other CSI, the eNB uses the UCI received from the UE to make a decision on the index sets to be used. This final decision is signalled to the UE on PDCCH as part of DCI. This method imposes some signalling overhead (e.g. on the uplink control channel and downlink control channel). For signalling $S_i$, one example approach is to define a bit map with length $R_i$ in which a '1' indicates that the corresponding layer shall be used for transmission, and a '0' indicates that the corresponding layer shall not be scheduled with transmission.

In general, this type of joint transmission can be described as in Equation (1) below.

$$y = \sum_i H_i W_i x(S_i) + n \quad (1)$$

where $x(S_i)$ denotes the elements of the data vector x with indices in the set $S_i$. $H_i$ is the channel matrix from $TP_i$ to the UE, $W_i$ is the precoding matrix or vector used by TP i, and n is the additive white Gaussian noise.

More specifically, in certain embodiments, the UE feeds back a per TP PMI and an RI assuming either joint or non-joint transmission, and CQI(s) for each TP assuming non-joint transmission. Also, one joint CQI for each codeword is fed back, where the total number of codewords is determined by the maximum number of data layers across all TPs.

In the case of joint transmission, to better match between the feedback PMI/RICQI from a UE and the actual channel used for the data transmission, the layers used at each TP are known by both eNB and the UE to facilitate more accurate CQI calculation. The layers used at a TP are indicated by index set, $S_i$. Each index set $S_i$ includes the index of the data layers to be transmitted from TP i. So that the network and the UE have a common understanding on the $S_i$ for each TP.

A rule may be defined on how to derive $S_i$ from RIs. Or some pre-defined index sets could be specified and signalled to the UE semi-statically for each TP. $S_i$ may be signalled from eNB to the UE (e.g. via RRC signalling or on downlink control channel). A preferred value of $S_i$ may be derived at the UE and signalled from UE to the eNB on uplink control channel. Based on the suggested $S_i$ and other UCI received from the UE, the eNB derives the $S_i$ that shall be used by TP i and signals it to the UE on PDCCH as part of DCI.

Calculation of precoding matrices $W_i$ and layer indices $S_i$ for each TP i can be performed jointly or independently (as in a single cell paradigm).

In certain embodiments, when performing a joint PMI/RI calculation, the UE determines the PMI/RI for all TPs jointly based on all channel matrices. Based on the deployment and application scenario and different performance optimization criteria, a plurality of approaches may be used.

In a first approach, a joint PMI and rank selection is performed based upon maximizing throughput. In a slow mobility scenario, maximizing the instantaneous link throughput may be desirable. To obtain the throughput, as the optimization criterion, the Equation (1) described earlier can be rewritten as in Equation (2):

$$y = \sum_i H_i \tilde{W}_i x + n, \quad (2)$$

where $\tilde{W}_i$ is a precoding matrix which depends on $W_i$ and $S_i$, and is obtained by starting with an all zero matrix and replacing columns indexed by $S_i$ with corresponding columns of $W_i$. Hence, selecting the PMI/RI/$S_i$ for each TP to maximize the theoretical link throughput can be formulated in Equation (3) as:

$$\{W_i, R_i, S_i\} = \quad (3)$$
$$\operatorname{argmaxlog}_2 \left| I + \frac{1}{\sigma_n^2} \left( \sum_i \sqrt{\frac{p_i}{R_i}} H_i \tilde{W}_i \right) \left( \sum_i \sqrt{\frac{p_i}{R_i}} H_i \tilde{W}_i \right)^H \right|$$

where, $p_i$ denotes the transmit power from TP i and $\sigma_n^2$ denotes receiver noise power plus interference (from cells outside of the CoMP set). Note that in the maximization above, the search space for $R_i$ includes all values in the range $0 \le R_i \le \min(N, M_i) = R_i^{max}$ for which a codebook is defined, where N is the number of receive antennas at the UE and $M_i$ is the number of transmit antennas in TP i. The case $R_i=0$ corresponds to $W_i=0$, i.e. an all-zero precoding matrix. Also, for a given $R_i>0$, the search space for $W_i$ is the codebook defined for rank $R_i$ and $M_i$ antenna ports. Moreover, the search space for $S_i$ is all subsets of $$\left\{ 1, \ldots, \max_i R_i \right\}$$

of size $R_i$.

Also, the inclusion of the all-zero precoding matrix allows the UE to suggest to the eNB the exclusion of a specific TP from the CoMP set in case the eNB finds it more beneficial to work with a fewer number of TPs. For example, if there are two TPs in the CoMP set and the received signal from one TP is much lower than the other TP, it is better to use only one TP for transmission in that case.

The method described above for jointly selecting the PMI, RI, and the layer assignment can be used to increase the throughput in a joint transmission scenario, where the PMI of each TP is to be selected from an existing codebook. However, this approach may lead to computational complexity at the UE. To reduce this complexity, the search spaces may be constrained to smaller sets. One way for doing this is to predefine the index sets $S_i$. Hence, the maximization in (3) will have to be carried out over PMI and RI only.

Accordingly, in certain embodiments, the UE measures all channels from TPs and jointly determines the PMI, the rank, and the selected layers for each TP to maximize the overall throughput criterion. Such information could be fed back to the eNB.

Also, in certain embodiments, the joint PMI and rank selection may be based on maximizing diversity. More specifically, in scenarios where the reliability of the transmission is prioritised rather than the throughput, increasing the degree of transmit diversity is desirable. One approach for joint determination of the PMIs to increase the diversity is orthogonalization of the equivalent channels from each TP. In this method embodiment, $W_i$ is chosen such that $H_i$ (i=1, 2, ...) are mutually orthogonal to each other, i.e.

$$W_i^H H_i^H H_j W_j = 0, i \neq j$$

For the above equation to have a solution, it is desirable that $$N \geq \sum_i R_i,$$

where N is the number of receive antennas and $R_i$ is the number of layers transmitted from TP i. At the same time, the selection of the $W_i$s should be such that the theoretical throughput is maximized. In other words, in this PMI selection method, the $W_i$s are selected to maximize the theoretical throughput subject to the orthogonality condition. With this method, the UE first detects the signal on each of the directions $H_i W_i$, and then combines them using a maximum ratio combining (MRC) receiver. Hence, a diversity gain may be achieved. This is in contrast to the throughput maximizing approach in which beamforming gain is achieved.

Accordingly, in certain embodiments, the UE measures all channels from TPs and jointly determines the PMI for each TP to maximize the orthogonality among equivalent channels from the set of TPs. Such information is fed back to the eNB.

Also, in certain embodiments, a per TP PMI and RI calculation is performed. More specifically, the UE calculates the PMI and RI for each TP independently and in a similar way to the legacy single TP systems. In other words, as opposed to the solution where each PMI/RI is determined by considering all channels together, in this embodiment, the PMI/RI of each TP is determined solely by the channel of the corresponding TP.

One benefit of this CSI calculation is that it is similar to the CSI calculation in legacy systems and therefore may be transparent to the UE. Additionally, the transmission scheme based on this method uses the power resources of all TPs. However, in this approach, because the PMI/RI calculation is carried out independently for all TPs, the signals from all TPs are added together at the UE with random phases and no inter-TP beamforming gain can be obtained.

If the index set $S_i$ is derived based on a predefined rule, only single cell PMI/RI needs to be fed back. For example, if $S_i = \{1, \ldots, R_i\}$, the transmission can be described as $$y = \sum_i H_i W_i x(1: R_i) + n$$

In an alternative approach, if the signalling of $S_i$ is possible on an uplink control channel, after deriving single cell PMI and RI, the index sets can be derived jointly. This operation can be performed by considering a metric similar to that of Equation 3 in which $W_i$ and $R_i$ are fixed and maximization is carried out with respect to $S_i$ only.

Accordingly, in certain embodiments, the UE calculates and feeds back PMI and rank separately for each TP, or with a fixed rank as configured by the eNB, and UE calculates and feeds back separate PMI with fixed rank for each TP. The eNB then transmits the same number of data streams or a portion of streams from each TP.

Also, in certain embodiments, a CQI calculation is performed. More specifically, after obtaining the PMI and RI, the CQI is derived based on the knowledge of what kind of receiver will be used and the calculation of the corresponding SNR on each data layer. For example, for an MMSE receiver, the SNR on layer k is obtained in Equation (4) as $$SINR_k = \frac{1}{\left[\left(I + \frac{1}{\sigma_n^2} H_{eq}^H H_{eq}\right)^{-1}\right]_{kk}} - 1 \quad (4)$$

where $$H_{eq} = \sum_i \sqrt{\frac{p_i}{R_i}} H_i \tilde{W}_i$$

is the equivalent channel observed by the UE.

For the CQI calculation of the $i^{th}$ TP for per TP data transmission, $H_{eq} = H_i \tilde{W}_i$ should be used in equation (4).

Alternately, in another embodiment, a feedback method provides Precoding Matrix Indicator (PMI), Rank Indicator (RI) and Channel Quality Indicator (CQI) feedback for each TP as well as common CQI and phase differences.

As discussed above, for the feedback of separate PMIs/RIs, these parameters can be calculated either separately or jointly. With the separate calculation method, little or no inter-TP diversity or beamforming gain can be achieved. Joint calculation, on the other hand, can provide inter-TP beamforming gain or diversity gain. However, because the precoding matrices are quantized, part of the potential gain cannot be achieved. One solution is to expand the codebook to obtain finer granularity for the precoding matrices. However, this method could require design of a new codebook which may not be desirable. Another approach is to re-use existing codebooks, but also feedback some extra channel-dependent information to better match the transmission to the channel state. More specifically, this additional information can comprise certain quantized phase values.

In this embodiment, to help the transmitters to form their signals such that their signals are combined coherently at the receiver, the UE calculates and feeds back a measure of the phase difference between the received signals of all TPs with respect to a reference TP, which is determined based on a pre-defined rule (e.g. the eNB in a single cell ID scenario could be the reference TP), or based on cell ID (in a multiple cell ID scenario). Also, the phase values can be relative without the eNB and the UE agreeing on a specific reference point. As a result, TP i can add a phase correction $\phi_{ik}$ to its data layer k. Considering a general case of mixed rank transmission, the transmission can be described in Equation (5) as:

$$y = \sum_i H_i W_i \Phi_i x(S_i) + n \quad (5)$$

$$= \sum_i H_i \tilde{W}_i \tilde{\Phi}_i x + n$$

$$= \sum_{k=1}^{R} \left(\sum_i e^{j\phi_{ik}} H_i \tilde{w}_{ik}\right) x_k + n$$

where $$\Phi_i = \text{diag}(e^{j\phi_{i1}}, e^{j\phi_{i2}}, \ldots, e^{j\phi_{iR_i}})$$

is the phase correction diagonal matrix for TP i, $R_i$ is the transmission rank from TP i (i=1, 2, ..., n and k=1, 2, ..., $R_i$) $\phi_{ik}$ is the phase correction for layer k from TP i, $\tilde{w}_{ik}$ is the k-th column of the precoding matrix $\tilde{W}_i$, and $\tilde{W}_i$ is a precoding matrix which depends on $W_i$ and $S_i$, and is obtained by starting with an all-zero matrix and replacing columns indexed by $S_i$ with corresponding columns of $W_i$. $\tilde{\Phi}_i$ is obtained in the same way from $\Phi_i$. If the phases are measured with respect to a reference TP, the phase matrix of the reference TP is an identity matrix. Hence, if the size of the CoMP set is $N_c$, then $N_c-1$ quantized phase matrices are fed back. If a reference TP is not defined, for example when the CoMP set dynamically changes, then for each TP one phase matrix should be reported.

The selection of the precoding matrices $W_i$ is such that, for each layer k, $H_i\tilde{w}_{ik}$ are as aligned as possible in the vector space. Consequently, phase corrections $\phi_{ik}$ are chosen such that the received signal vectors of each data layer are added constructively at the receiver. If throughput maximization is considered as the selection criterion, then selection of $W_i$, $R_i$, $S_i$, and $\Phi_i$ can be described in Equation (6) as $$\{W_i, R_i, S_i, \Phi_i\} = \text{argmax} \log_2 \left| I + \frac{1}{\sigma_n^2} \left( \sum_i \sqrt{\frac{p_i}{R_i}} H_i \tilde{W}_i \tilde{\Phi}_i \right) \left( \sum_i \sqrt{\frac{p_i}{R_i}} H_i \tilde{W}_i \tilde{\Phi}_i \right)^H \right| \quad (6)$$

where $\Phi_i$ are chosen from a set of quantized phase matrices.

If the number of receive antennas at the UE is one, and thus the number of layers must be one, then the above joint calculation of $W_i$s and $\Phi_i$s, i.e. throughput maximization, is decoupled for different TPs. Also for a TP i, $W_i$ and $\Phi_i$ can be obtained sequentially. To see this, note that in the single receive antenna case, the throughput maximization is equivalent to $$\max_{W_i \in B, \phi_{i1}} \left| \sum_i \sqrt{p_i} e^{j\phi_{i1}} H_i W_i \right|^2$$

where B refers to a codebook. Each term $H_i W_i$ can be maximized separately from other terms, i.e. $W_i$ only depends on $H_i$. Since $W_i$ is chosen from the codebook, $H_i W_i$ with the best $W_i$ generally being a complex number, i.e. with both a magnitude and a phase. Subsequently, the phases $\Phi_{i1}$ should be chosen such that all complex numbers $e^{j\Phi_{i1}} H_i W_i$ (i=1, 2, ...) have the same phase.

After obtaining $W_i$, $R_i$, $S_i$, and $\Phi_i$, the common CQI can be derived by calculating the SNR on each layer from (4), where $$H_{eq} = \sum_i \sqrt{\frac{p_i}{R_i}} H_i \tilde{W}_i \tilde{\Phi}_i.$$

Accordingly, in certain embodiments, in addition to PMI/RI/CQI feedback, a UE may feedback one phase value per TP per data layer.

Alternately, in another embodiment, a feedback method provides Precoding Matrix Indicator (PMI) and Channel Quality Indicator (CQI) feedback for each TP as well as common RI and CQI. More specifically, in this embodiment, a PMI assuming joint transmission and CQI(s) assuming non-joint transmission are fed back for each TP. However, a common RI and a common CQI per codeword for all TPs (both derived assuming joint transmission) are fed back to the eNB. Because of reduced RI feedback, this method has relatively smaller feedback overhead compared to the method which provides a per-TP RI. Using common RI for multiple TP also leads to a more balanced transmission across different layers. For simplicity, the common RI can be chosen based on the minimum rank that all TPs can support.

Because the RI is the same for all TPs, this feedback mechanism is suitable to support a combination of codebook-based precoding and transmit diversity schemes. To be more specific, an Alamouti code can be applied to single layer data to generate two layers of coded data, one for each TP. The data at each TP is then precoded using the feedback PMI for the TP.

Accordingly, in certain embodiments, the UE measures all channels from the TPs and determines a common rank for joint transmission from all TPs and calculates separate PMI and CQI for each TP and joint CQI, one for each codeword. The common rank is obtained jointly or by simply selecting the smallest rank of those derived for the plurality of separate channels from each TP. Such information is then fed back to the eNB.

Alternately, in another embodiment, a feedback method provides Precoding Matrix Indicator (PMI), Rank Indicator (RI), and Channel Quality Indicator (CQI) feedback for each TP with a Rank 0 included. Having separate RI reports for different TPs means that different TPs may transmit with different ranks. Depending on the channel matrices of the TPs, in some situations, the UE may choose to receive all data layers that it can handle, from a single TP or from a subset of the associated TPs. In other words, for some realizations of the fading channel, there may be some TPs from which the UE does not prefer to receive data. In this case, the UE assigns an RI corresponding to rank 0 to such TPs. Alternatively, CQI index 0 could be used for this purpose or other signalling methods could be considered.

Accordingly, in certain embodiments, the UE feeds back separate PMI, RI, and CQI for each TP, where the number of CQIs for each TP is determined by the corresponding RI. The feedback also includes the indication that the UE prefers not to receive transmission from a particular TP or TPs. To indicate to eNB that the UE does not prefer to receive transmission from a particular TP, one of a plurality of methods can be used. More specifically, in one method, the UE can use CQI index 0, which is already defined in the specification to indicate CQI out of range. Alternately, the UE can add a state corresponding to no transmission, i.e., rank-0, to the rank index table and send that index as the RI. Alternately, the UE can add an all-zero PMI to the codebooks and feedback the corresponding RI and the all zero PMI when this situation occurs. Alternately, the communications with the UE can include a bit to indicate if a TP is not preferred by the UE. Alternately, the UE could signal this semi-statically (e.g. via RRC signalling) to the eNB using a bitmap.

Alternately, in another embodiment, a feedback method provides independently selected sub-band feedback of Precoding Matrix Indicator (PMI), Rank Indicator (RI) and Channel Quality Indicator (CQI) for each TP. In a fading environment, the channels from multiple TPs to the same UE may be completely independent due to the geographical separation of the TPs. As a result, applying frequency selective scheduling for that UE on multiple TPs may require assignment of separate sub-bands to that UE for different TPs. This could result in a more efficient frequency resource utilization across the cell(s) compared to a scenario where UE is assigned the same sub-band on all TPs.

Transmission on separate sub-bands of the same carrier from different TPs can be supported by feeding back separate PMIs/RIs/CQIs for each sub-band for different TPs. However, the need to support sub-band CSI feedback for each TP may require a large amount of feedback. The amount of feedback can however be significantly reduced by feeding back the CSI corresponding to selective parts of the bandwidth.

For example, the UE can only feedback the CSI of the best TP on each sub-band. In this context, the best TP can be defined for example as the TP offering the highest throughput in that sub-band.

Also for example for each TP, the UE can feed back the CSI of only those sub-bands with good channel quality (with some certain criterion, for example, overall SNR is above some thresholds). Alternatively the UE feeds back the CSI on the best M sub-bands for each TP. This is an extension of the UE-selected sub-band feedback which exists in the current specifications These selective feedback approaches reduce the feedback, but may impose some limitations on the performance of the eNB scheduler. The feedback mode (e.g. feedback CSI on all sub-bands, or feedback CSI on selected sub-bands only) could be configured semi-statically through higher layer (e.g. RRC) signalling.

Accordingly, in certain embodiments, the UE feeds back single-cell PMI/RI/CQI for each TP separately on some selected sub-bands. Depending on the selection method and also the channel coefficients, the sub-bands on which the UE reports PMI/RI/CQI for different TPs may or may not overlap. A plurality of sub-band selection methods are contemplated. For example, for each sub-band, the CSI of the best TP or a number of best TPs is reported. The CSI and selected TP index should be fed back for each sub-band. The criteria for determining the best TP or TPs may be defined based on throughput or received SNR. Also for example, for each TP, the CSI on a certain number of sub-bands is reported. These sub-bands could include those with good channel conditions or simply the best M sub-bands for that TP, where M is pre-defined and known by both transmitter and the receiver. For each TP, the CSI parameters and the indices of the best M selected sub-bands should be fed back.

In another embodiment, transmission schemes for enabling feedback solutions that functions in conjunction with CoMP transmissions are set forth.

More specifically, in one embodiment the transmission schemes for enabling feedback solutions provides forth.

When considering transmission schemes for enabling feedback solutions, two main scenarios for CoMP operation can be considered. In the first scenario, all TPs in a CoMP set transmit DL data to a UE on the same frequency resources or sub-band at a given time. In the other scenario, TPs in the CoMP set may transmit on separate sub-bands to a UE on a given carrier at a given time. This is motivated by the fact that the channels from different TPs to the UE are statistically independent and separate frequency selective scheduling may be carried out for different TPs. Since TPs are geographically separated, this method may lead to more efficient frequency reuse and more flexibility in resource management across the cell. These two scenarios are addressed in this section.

More specifically, in one embodiment, the transmission scheme for enabling feedback solutions that function in conjunction with CoMP transmissions provides for a multi-point transmission on the same sub-bands with the same codeword. With this transmission scheme, it is assumed that all TPs transmit on the same time/frequency resources.

Additionally with this transmission scheme, each TP i is assigned with a precoding matrix $W_i$ selected from existing codebooks. In general, the dimensions of $W_i$s may be different, as the transmission rank and also the number of antenna ports in the TPs may be different. The transmission rank of TP i shall be denoted by $R_i$. By assuming x is the vector $$\left(\text{of length } R = \max_i R_i\right)$$

of data layers to be transmitted jointly by all TPs. For each TP, if its transmission rank $R_i$ is smaller than the total number of data layers R, another parameter is used to describe the assignment of some data layers in x to that specific TP. Thus, $S_i \subseteq \{1, \ldots, R\}$, $|S_i|=R_i$ is defined as the index set of data layers sent from TP i. The transmission can be described in Equation (7) as $$y = \sum_i H_i W_i x(S_i) + n \qquad (7)$$

where $x(S_i)$ denotes the elements of x with indices in the set $S_i$, $H_i$ is the channel matrix from TP i to the UE, $W_i$ is the precoder vector or matrix used by TP i, and n is the additive white Gaussian noise.

Accordingly, in certain embodiments, TPs transmit the same data layers (or a subset of them) on the same frequency/time resources using different precoding matrices. If the rank of a precoder used by a TP is smaller than the number of data layers, a subset of the data layers is selected and transmitted by the corresponding TP. The subset of layers is known by the UE for CQI calculation purposes.

To support this scheme in the general case of unequal ranks, the feedback mechanism which feeds back PMI/RI/CQI for each TP plus common CQIs is used. The selection method based on maximizing the throughput is described in Equation 3. The data layer assignments (parameters $S_i$) may be predefined and known by both the UE and the TPs. Also, the data layer assignment may be dynamically derived, for example from Equation 3. In the latter case, some additional signalling is likely required to feedback $S_i$. The eNB could make the final assignments based on the feedback and other considerations and signal the assignment to the UE.

In a special case, where all TPs transmit with the same rank, the feedback mechanism which feeds back PMI/CQI for each TP plus a common RI/CQI can also be used. In this case, the relation between the received signal and the data layers is simplified to:

$$y = \left(\sum_i H_i W_i\right) x + n$$

In another embodiment, the transmission scheme for enabling feedback solutions that function in conjunction with CoMP transmissions provides distributed beamforming with phase corrections.

This scheme is supported with the feedback mechanism which feeds back PMI/RI/CQI for each TP plus common CQIs and phase differences, where some additional feedback (in the form of phase differences between a TP and a reference TP) are available to the transmitter. As discussed with respect to this feedback mechanism, the additional feedback may partially compensate for the effects of precoder codebook quantization and may yield larger beamforming gains. The scheme is described in Equation 5. The proposed scheme supports transmission of rank>1 by using one phase correction for each layer of data on each TP. This is different from certain known methods where only one phase value per UE is used. Also, this scheme allows for transmitting mixed ranks, i.e. different ranks from different TPs. This can be useful when the number of antenna ports varies across the TPs or when at a certain instance the fading channel of a TP is not sufficient to support as many data layers as other TPs do.

Accordingly, in certain embodiments, TPs transmit the same data layers on same time/frequency resources using different precoding matrices. Each data layer k, on TP i may be multiplied by $e^{j\Phi_{ik}}$, where $\phi_{ik}$ is a phase value fed back from the UE. Additionally, in certain embodiments, if the rank of a precoder is smaller than the number of data layers, a subset of data layers are transmitted by the corresponding TP. The subset is known by the UE for CQI calculation purposes.

In another embodiment, the transmission scheme for enabling feedback solutions that function in conjunction with CoMP transmissions provides multi-point transmission on the same sub-bands with different codewords.

One way to utilize a multiple TP deployment structure is to use the TPs for increasing the transmission data rates delivered to the UE. As described with respect to the feedback mechanism which feeds back PMI/RICQI for each TP with rank-0 included, this can be realized by transmitting different data layers from different TPs.

In known LTE specifications, the data layers are formed from one or two transport blocks (TB). Hence, all TPs transmit the same TB and therefore use the same CQI(s). However, it is possible to increase the number of TBs by transmitting different TBs from different TPs, and therefore supporting more than two TB transmission to the UE. If that is the case, the use of TP-specific CQI feedback may be required. This scenario can be supported by the feedback mechanism which feeds back PMI/RICQI for each TP with rank-0 included.

Accordingly, in certain embodiments, TPs could transmit different data layers on the same time/frequency resources. The data layers from different TPs could come from different transport blocks. More than two TBs could be transmitted to the same UE. Additionally, in certain embodiments, a TP may be assigned a rank-0 transmission. This should be signalled to the UE.

In another embodiment, the transmission scheme for enabling feedback solutions that function in conjunction with CoMP transmissions provides transmit diversity across TPs.

Figure 10:
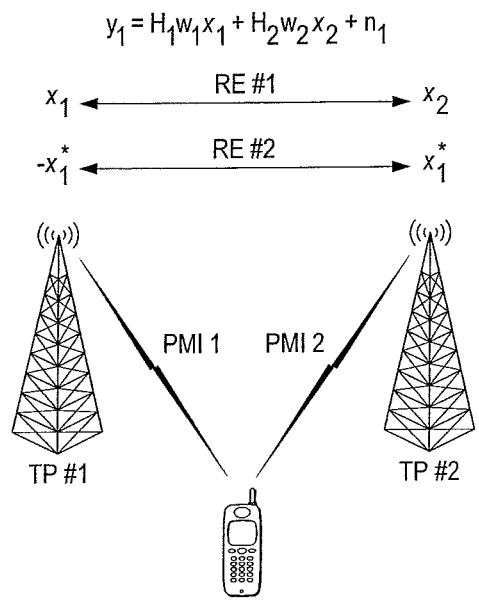
FIG. 10 shows a block diagram of an example of beamformed distributed transmit diversity.

More specifically in certain embodiments where the transmission scheme for enabling feedback solutions that function in conjunction with CoMP transmissions provides transmit diversity across TPs, an Alamouti code is applied across TPs to achieve diversity gain. As shown in FIG. 10, the Alamouti codeword can be applied to a pair of REs, which can be either two consecutive (or otherwise closely-spaced) subcarriers in frequency (similar to SFBC coding) or can be two REs on the same subcarrier frequency but in two different (but preferably closely-spaced) time instances (similar to STBC coding). Two layers of data are generated after Alamouti coding, each layer being dispatched to one TP, where precoding is applied separately before transmission. The precoding applied by each TP is based on the feedback from the UE for that particular TP. For a mathematical description of this method, assume $x_1$ and $x_2$ are two modulation symbols. On RE #1, TP1 transmits $x_1$ with a precoder $w_1$ and TP2 transmits $x_2$ with a precoder $w_2$. Hence, the UE receives $$y_1 = H_1 w_1 x_1 + H_2 w_2 x_2 + n_1$$

At RE #2, assuming the channels do not change significantly over these two REs, TP1 transmits $-x_2^*$ with precoder $w_1$ and TP2 transmits $x_1^*$ with precoder $w_2$. Hence, the UE receives $$y_2 = -H_1 w_1 x_2^* + H_2 w_2 x_1^* + n_2$$

This is an Alamouti code with an effective channel matrix $$H_{eff} = [H_1 w_1\ H_2 w_2]$$

To decode the Alamouti codes at the UE, separate DM-RS ports are used for each TP. For example, DM-RS ports 7 and 8 as defined in Rel-10 could be used for each TP, which are transmitted on the same REs and separated by different orthogonal codes. If such transmission is configured to the UE as a transmission mode, the DM-RS ports used could be pre-defined and may not need to be signalled to the UE.

Accordingly, in certain embodiments, in a two TP CoMP set scenario, each TP could transmit one layer of data on the same time/frequency resource as the other TP. Layer mapping to the TPs may be performed based on 2-tx transmit diversity (Alamouti coding) as defined in LTE, but the Alamouti coded streams could then be precoded and transmitted by each TP separately. Separate DM-RS ports would be used for each TP for data demodulation at UE.

Because the performance of the Alamouti code depends on the norm of the channel matrix, i.e. $|H_1 w_1|^2 + |H_2 w_2|^2$, the optimum precoding vector $w_i$ for TP i can be chosen individually and solely based on the corresponding channel $H_i$. If the number of TPs is more than two, TPs can be paired such that each pair transmits one Alamouti codeword but in a resource different from the resource used by other pairs (similar to 4-antenna Alamouti in LTE Rel-8 and Rel-10).

One approach is to transmit Alamouti codewords on orthogonal sub-spaces. In other words, the precoding vectors should be chosen such that the paired layers from the two TPs occupy a single dimension in the received vector space. Also, different layers should be orthogonal at the receiver vector space. With this method, different data layers, corresponding to different Alamouti codewords, are easily decoupled at the receiver side and a simple Alamouti decoder can be applied.

An alternative approach for jointly selecting the precoding matrices is to derive the effective channel matrix in terms of actual channel matrices and the precoding matrices and choose the PMIs such that the capacity (corresponding to the effective channel matrix) is maximized. With this approach, a more advanced receiver structure may be needed for detecting the data.

In this method, all TPs should transmit with the same rank so that layers from two TPs can be paired to form an Alamouti codeword. Also, the data on different TPs come from the same codeword. Hence, the TPs share the CQI as well. But, each TP may use a PMI different from other TPs. As a result, the feedback mechanism which feeds back PMI/RICQI for each TP with rank-0 included may be used to support this transmission mode.

Figure 11:
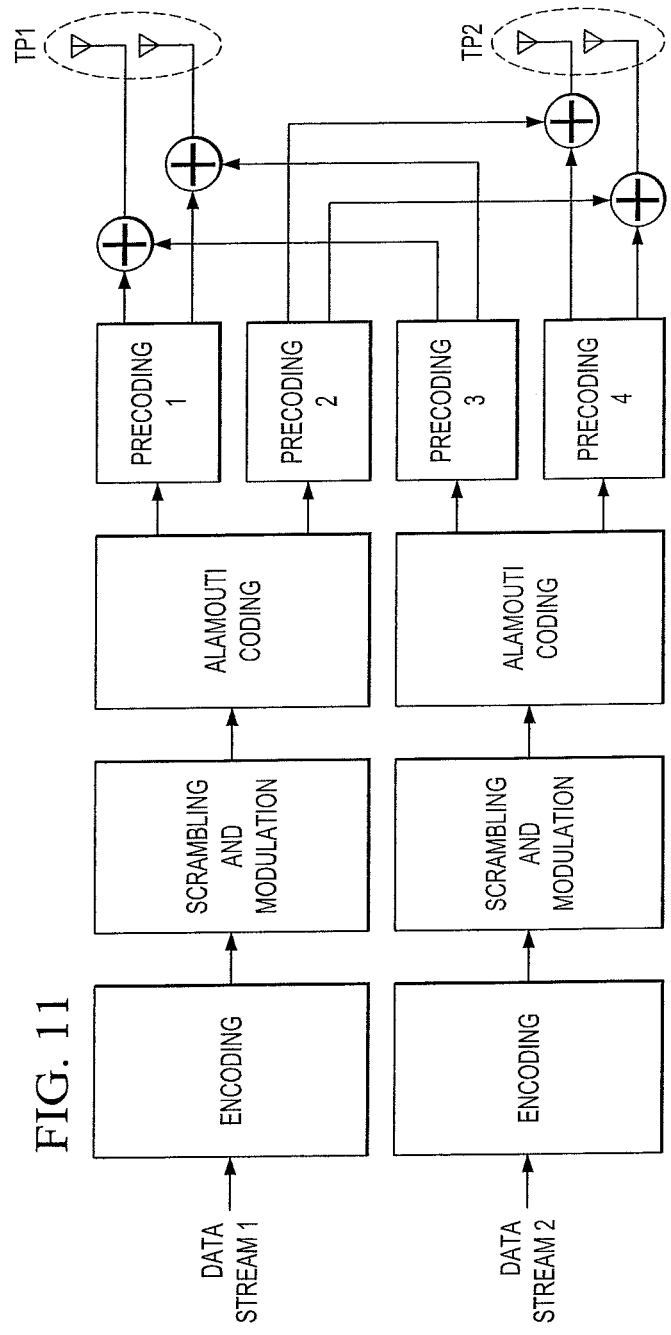
FIG. 11 shows a block diagram of an example of a rank 2 data transmission with Tx diversity across two TPs, each with two antennas.

In general, it is possible to transmit R layers of data from each TP and to apply an Alamouti code on each layer separately, an example of R=2 is shown in FIG. 11 with two TPs. This leads to the transmission of multiple Alamouti codewords on the same resources. The process of selecting the precoding matrices is more complicated in this general scenario and may be required to be performed jointly for all TPs.

Accordingly, in certain embodiments, in a two TP CoMP set scenario, TPs may transmit the same number of data layers on the same time/frequency resource. Each layer of TP #1 is paired with one layer of TP #2 and layer mapping is performed such that each pair of layers forms an Alamouti code. A separate DM-RS port could be used for each layer transmitted from each of the TPs.

In another embodiment, the transmission scheme for enabling feedback solutions that function in conjunction with CoMP transmissions provides inter-TP transmit diversity without precoding.

An inter-TP transmit diversity scheme with precoding is described above which exploits both precoding and transmit diversity gains. In an alternate embodiment, if each of two TPs has one antenna port, the precoding operation can be skipped, and each pair of symbols after Alamouti coding could be dispatched to each TP and transmitted without precoding.

If each of the two TPs has two antenna ports, the 4-tx transmit diversity scheme as adopted in LTE Rel-8, or so-called SFBC+FSTD, can be applied across the total of four antenna ports from two TPs. This scheme would only benefit from the diversity gain, but it has the advantage that it does not require PMI feedback from the UE, and therefore, could improve the performance of UEs having relatively high mobility.

To decode Alamouti codes, TP specific RS are transmitted from each TP. As common RS (CRS) may need to be transmitted from all TPs to support legacy UE, DM-RS ports as defined in Rel-9/10 could be reused for this purpose or new TP specific RS ports could be defined. No precoding is applied to DM-RS ports within the assigned RBs.

Accordingly, in certain embodiments, Rel-8 2-tx and 4-tx transmit diversity are applied across TPs to form transmit diversity for CoMP transmission. TP specific RS ports may be defined or DM-RS ports as defined in Rel-9/10 may be reused for channel estimation where no precoding is applied to DM-RS ports within assigned RBs.

In another embodiment, the transmission scheme for enabling feedback solutions that function in conjunction with CoMP transmissions provides open-loop spatial multiplexing CoMP transmission.

In this transmission, the same layers of data could be transmitted from different TPs or different layers of data could be transmitted from different TPs, and either no precoding or a pre-defined precoding are applied at the TPs. No PMI feedback is needed, only CQI is fed-back from the UE.

In another embodiment, the transmission scheme for enabling feedback solutions that function in conjunction with CoMP transmissions provides multi-point transmission on separate sub-bands.

Figure 12:
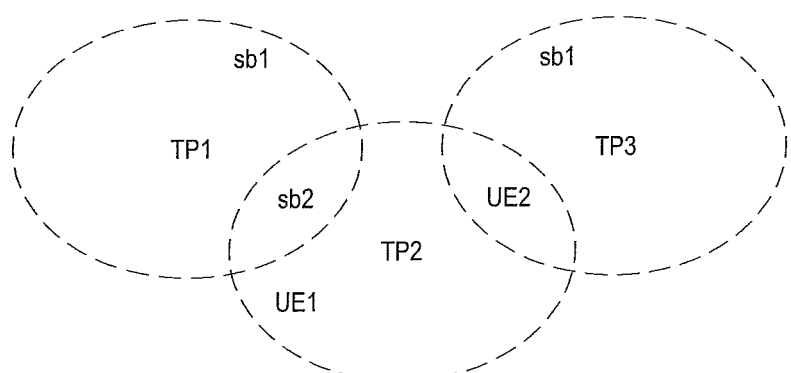
FIG. 12 shows a block diagram of an example of resource allocation in separate sub-band transmission modes.

In a CoMP scenario, where TPs are geographically separated, their large-scale fading (shadowing) and small-scale fading (multipath) channels to the UE are both independent from each other. Hence, if a UE sees a good channel from one TP on a sub-band, it does not necessarily lead to the UE seeing good channels from other TPs on the same sub-band. In such a situation, forcing all TPs to use the same sub-band for transmission to the same UE may prevent the system from fully exploiting the potential gain that is available through frequency selective scheduling. In other words, by allowing the TPs to transmit on separate sub-bands, they can individually carry out frequency selective scheduling which could lead to performance gains for each UE. From the system level point of view, compared to transmission on the same sub-bands from all TPs, this approach may require an overall larger bandwidth for transmission to the UE. However, it should be noted that by having frequency reuse across the cell(s), the overall bandwidth utilization may not be affected by this approach. For example, in FIG. 12, UE 1 is scheduled on sub-band 1 (sb 1) from TP #1 and sub-band 2 (sb 2) from TP #2, because the corresponding channels on those sub-bands are the best for each respective TP. At the same time, TP #3 can reuse sb 1 to service UE #2. Since UE#2 is in the coverage area of TP #2, sb 2 could not be used for it as TP #2 already used sb 2 to serve UE #1. It should be noted that separate sub-band transmission provides the scheduler with more flexibility which could allow for more efficient scheduling.

Accordingly, in certain embodiments, transmission on separate sub-bands from different TPs could be used to fully exploit the frequency selective scheduling gains available from multiple TP to UE propagation channels. If the same MCS and same TB is used for all sub-bands, transmission on separate (non-overlapping) sub-bands from multiple TPs may be supported by reusing the current downlink grant structure (DCI) as defined in Rel-8. Otherwise, the DL grant structure may need to be changed to accommodate the overhead required for supporting transmission on separate sub-bands (for example, instructing the UE which RBs it is scheduled on and which MCSs are used).

More specifically, in certain embodiments, the transmission scheme for enabling feedback solutions that function in conjunction with CoMP transmissions provides multi-point transmission on separate sub-bands use codeword splitting.

Figure 13:
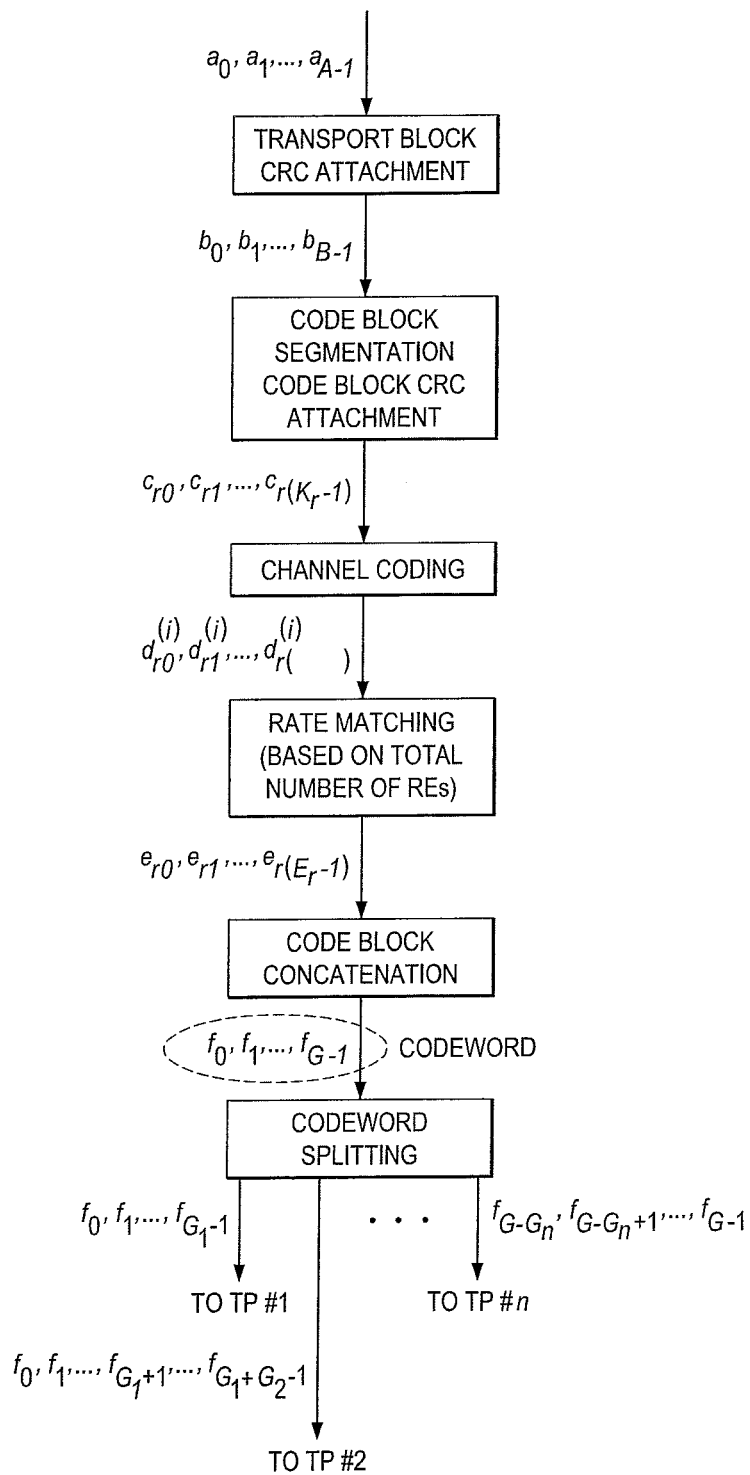
FIG. 13 shows a flow chart of an example of CoMP codeword splitting for a single codeword.

If a UE is scheduled to receive data from multiple TPs on different sub-bands, one possibility is to split each codeword into different segments and transmit each segment via a different TP. An example of codeword splitting is shown in FIG. 13. CRC attachment, code block segmentation, channel coding, rate matching, and code block concatenation are performed as defined in the known specifications (see e.g., 3GPP TSG-RAN TS 36.212). Rate matching is performed based on the total number of REs assigned to all TPs. The codeword length at the output of code block concatenation is denoted by G. By codeword splitting the whole codeword is broken into n disjoint segments, where segment i has length $G_i$ and is sent to TP #i for further processing, i.e. scrambling, modulation, layer mapping, precoding, etc. The segment lengths $G_i$ are arranged such that $G=\Sigma G_i$.

The splitting shown in FIG. 13 is an example in which the first $G_1$ coded bits are assigned to TP #1, the next $G_2$ bits are assigned to TP #2, and so on. In general, any segmentation of the codeword would work. Codeword splitting mentioned here is different from code block segmentation which is part of the channel coding.

The codeword splitting in FIG. 13 is shown for a single codeword only. If the UE is scheduled for more than one codeword, the same procedure can be applied for each codeword separately.

If different TPs have the same cell ID, as in CoMP scenario 4 with RRHs, the scrambling sequences for all TPs may be the same. In such a scenario, most of the processing can be performed in a central unit, say at a Macro eNB, and the precoded signals can be sent to the TPs for resource mapping and transmission. This is suitable for scenarios when the RRHs have low processing capabilities.

To support this scheme, the feedback from a UE can include separate PMIs, RIs, and CQIs for all the associated TPs on all the sub-bands. This can be performed by the feedback mechanism which feeds back PMI/RICQI for each TP with rank-0. However, in this scenario, there is no need for joint calculation of the CSI and the CSI of each TP is calculated as in a single-cell manner (because on each sub-band only one TP transmits to the UE). To reduce feedback overhead, the UE can use a selective feedback mechanism which independently selects sub-band feedback of PMIs/RIs/CQIs for each TP. Examples of this include feeding back the CSI of the best TP for each sub-band or, feeding back the best M sub-bands for each TP.

To support this scheme, the eNB may need to derive a common CQI for MCS assignment. One way to derive this information is to use the wideband CQI feedback from the UE. Alternatively, eNB can use the CQIs which are available to it for all scheduled sub-bands to derive a single CQI for obtaining the MCS. One approach for doing this is to use the worst CQI amongst all CQIs of allocated sub-bands. An alternative approach is to estimate the SNR of each sub-band based on its CQI and then average over them (for example by using the Exponential Effective SNR Mapping—EESM). The averaged SNR can be used to obtain a single CQI for all sub-bands and from which the MCS to be used over these separate sub-bands is determined. If a single CQI is derived at the eNB, only one MCS should be included in the DL grant. Hence, the existing LTE downlink grant structure defined in Rel-8/9/10 could be reused. By doing this, transmission on separate sub-bands from different TPs could be transparent to the UE as the UE does not need to know which sub-band is transmitted from which TP.

Accordingly, in certain embodiments, different TPs may transmit different portions of a codeword on separate sub-bands. A single MCS is used across all the sub-bands scheduled.

In certain embodiments, the transmission scheme for enabling feedback solutions that function in conjunction with CoMP transmissions provides multi-point transmission by transmitting the same codeword (TB) on different sub-bands.

Figure 14:
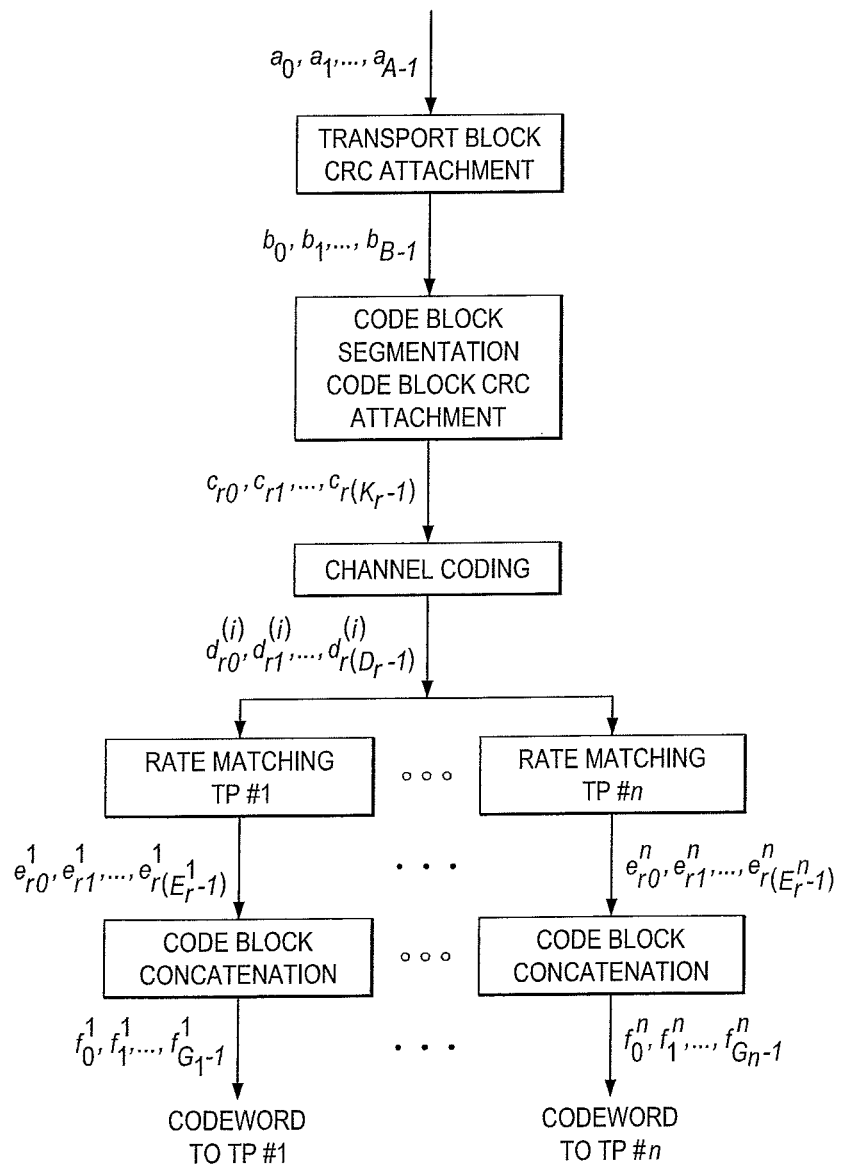
FIG. 14 shows a flow chart of an example of transport block processing for repeating the output of channel encoder on separate sub-bands.

More specifically, in this alternative approach for taking advantage of transmission on separate sub-bands, the output of the channel encoder is used by all TPs. However, each TP applies a rate matching processing operation separate from other TPs. As shown in FIG. 14, the output of the channel coding is sent to all TPs, and each TP, depending on its number of REs, applies rate matching and then code block concatenation.

In this scheme, different TPs can use different MCSs and there is no need for averaging the CQIs.

Since the same data is transmitted on multiple uncorrelated sub-bands, frequency diversity gain is expected if the receiver is designed properly. This may be performed by calculating the log-likelihood ratios (LLRs) of information bits on each sub-band and then combining them together before making a hard decision.

Any feedback mechanism that provides single cell PMIs, RIs, and CQIs can be used. To support this scheme, a downlink grant is designed to allocate different MCS for each sub-band, while maintaining one TB for the whole data traffic.

More specifically, in certain embodiments, different TPs may use the output of the same channel encoder and apply rate matching separately. Then, each TP may transmit its codeword on a separate sub-band from other TPs. Different MCS are assigned to each sub-band and this information needs to be signalled to the UE.

In certain embodiments, the transmission scheme for enabling feedback solutions that function in conjunction with CoMP transmissions provides multi-point transmission by transmitting separate codeword(s) on separate sub-bands.

CoMP structures can be used to increase the data rate or the multiplexing gain of the UEs. Separate sub-band transmission from different TPs is a scenario which readily allows exploitation of this potential of CoMP. When different TPs are scheduled to transmit on separate sub-bands to serve a UE, each TP can transmit a separate codeword or TB. As each TP could transmit on different sub-band, the MCSs corresponding to these codewords may be also different. This way, multiple TBs can be transmitted to the UE at the same time on different sub-band.

The feedback mechanism which provides single cell separate CSI feedback or single cell selective feedback may be used with this transmission scheme.

To support this scheme, separate downlink grants may be used to schedule different data transmission to the UE. In another embodiment, a new downlink grant may be designed which includes different MCS assignment for separate sets of sub-bands transmitted from different TPs.

Accordingly, in certain embodiments, each TP may have a separate TB on which the TP applies channel coding. Different MCS may be assigned to each TB. The different TBs can then be transmitted on separate sub-bands from different TPs.

In other embodiments, methods for configuring feedback and transmission schemes that functions in conjunction with CoMP transmissions are set forth.

The various feedback schemes and transmission schemes described may be applied to different scenarios. However, to reduce the complexity at both eNB and UE to support CoMP transmission, it is preferable to allow these schemes to be configurable. On the other hand, it is desirable to allow enough flexibility at the eNB to determine which transmission schemes may be used for each sub-frame, and such switching between transmission and feedback schemes should preferably bring about minimum or no impact to the UE.

More specifically, in one embodiment, a method for configuring feedback schemes that functions in conjunction with CoMP transmissions is set forth.

As discussed, there are various ways for the UE to derive the appropriate PMI, RI and CQI and feed them back to the eNB. Such methods of deriving these parameters could be a UE implementation issue as long as they meet certain performance requirements. In general, for multiple TPs, different PMI needs to be derived and fed back. For RI and CQI, there are different approaches, either deriving and feeding back separate RI and CQI for each TP, or deriving and feeding back common RI and CQI for all the TPs.

Another consideration in feedback design is that of backwards compatibility. Generally, it is preferable to reuse existing feedback schemes (modes) where possible (i.e., modes developed in previous specification releases) and thus reduce the impacts arising from the introduction of new schemes on the UE complexity. Certainly some modifications on these existing modes may need to be considered.

Figure 15:
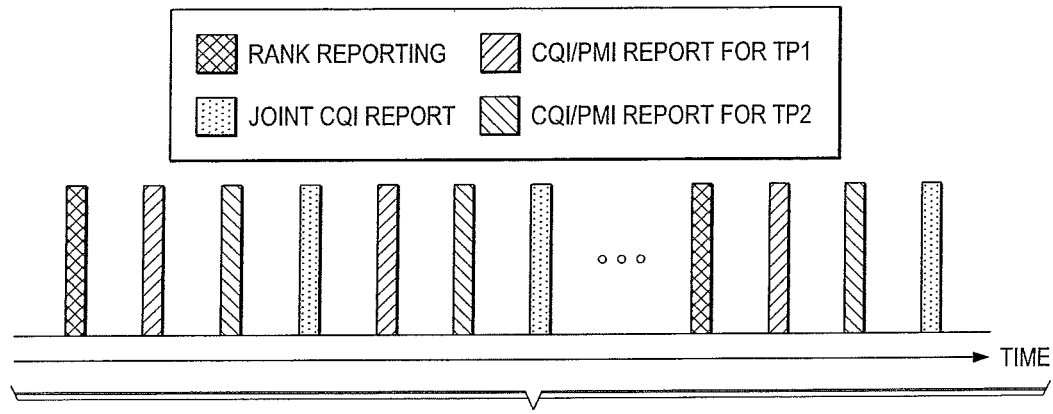
FIG. 15 shows a block diagram of CSI feedback for closed-loop CoMP transmission.

Some principles which may be used as the baseline for feedback design in closed-loop CoMP transmission are shown in FIG. 15. More specifically, FIG. 15 shows a feedback reporting example using time division multiplexing, in which it is assumed that a joint rank (across TPs) is derived and fed back via uplink channels to the eNB (e.g., via PUCCH or PUSCH). Subsequent to such a rank report, a CQI/PMI report could be fed back to TP #1, followed by a CQI/PMI report to TP#2. The same reporting formats as defined in Rel-8 could be used for these two reports and they may be transmitted via PUCCH or PUSCH in subsequent subframes. Following this, a joint CQI report could also be fed back.

Alternatively, the rank report, individual PMI/CQI reports for each TP and joint CQI report for a plurality of TPs could be encoded and transmitted together. Transmission of such a jointly-encoded multi-TP feedback report would be more suited to transmission on PUSCH although modification of PUCCH to accommodate these is also possible.

Accordingly, a plurality of embodiments relate to feedback reporting for closed-loop CoMP transmission. For example, one embodiment relates to supporting feedback of common rank (one rank for all TPs) or separate ranks for each TP. Separate ranks for each TP could be jointly coded and fed-back together within the same rank report. In another embodiment, for each TP, separate CQI/PMI reports as defined in Rel-8 or Rel-10 could be fed back to the eNB. The CQI feedback in such reports could assume single TP transmission and could be derived in the same way as defined in previous releases. In another embodiment, the CQI/PMI reports for each TP could be transmitted in either PUCCH or PUSCH. Different reports for different TPs could be transmitted in different subframes (e.g., transmitted in periodic report on PUCCH) in a time multiplexed (TDM) manner. If subband CQI/PMI reports for each TP is configured, such reports could be transmitted on PUCCH in a time multiplexed (TDM) manner that subband CQI/PMI reports for one TP is transmitted in sequence followed by those for second TP and so on. Or subband CQI/PMI reports of different TPs are interleaved in a sequence and transmitted in different PUCCHs. Alternatively, all reports for different TPs could be multiplexed and/or encoded together (e.g. sent within an aperiodic report on PUSCH). In another embodiment, in addition to the above reports, CQI reports could be configured in which a joint CQI is derived assuming that the same layers of data would be transmitted from each TP. Such reports could be transmitted in a multiplexed fashion with other CQI/PMI reports in TDM manner (e.g. on PUCCH using a periodic reporting structure) or multiplexed with other CQI/PMI reports and encoded and/or transmitted together (e.g. on PUSCH as an aperiodic report). In another alternative, CSI feedback reporting could be transmitted on both PUCCH and PUSCH, for example, RI report, wideband CQI/PMI report per TP and wideband joint CQI could be transmitted on PUCCH in a TDM manner, while subband PMI/CQI for each TP and subband joint CQI could be transmitted on PUSCH.

In known specification releases, different types of feedback modes are defined which derive and report different types of CQI/PMI including wideband reporting, selected sub-band reporting and all sub-band reporting. With the introduction of multiple TPs in the system which support CoMP operation, the feedback reports for different TPs could follow the same reporting style as previously defined.

Additionally, a plurality of other embodiments relate to closed-loop CoMP transmission. For example, in one embodiment, the Rel-8 feedback modes 1-1, 2-1 for PUCCH, and modes 3-1, 1-2 and 2-2 for PUSCH could be extended for closed-loop transmission. In such modes, for each TP, the same types of feedback reports as defined in Rel-8 could be used. In addition, joint CQI reports could be derived and fed-back. In another embodiment, for selected sub-band reporting, the selection of best-M sub-bands can be based on joint CQI from multiple TPs instead of individual CQI for each TP. The UE could then derive and feedback separate CQI/PMI reporting for each TP based on selected sub-bands but assuming individual transmission from each TP. The UE could in addition derive and feedback joint CQIs for each selected sub-band by assuming joint transmission from all TP.

For CoMP transmit diversity and open-loop spatial multiplexing transmission, CQI only feedback could be considered. The feedback modes could be based on modes 1-0 and 2-0 on PUCCH, or modes 2-0 and 3-0 on PUSCH, and separate CQIs for each TP are reported. Joint RI/CQI reports could be fed back for open-loop CoMP transmission on top of separate CQI feedback for each TP, which would allow the eNB to dynamically switch between CoMP and individual per TP transmission.

A plurality of embodiments relate to open-loop CoMP transmission. For example, the feedback modes 1-0, 2-0 for PUCCH, and modes 2-0, 3-0 for PUSCH could be considered as the baseline for feeding back separate CQI for each TP. Also for example, joint CQI derived based on transmission from all TP could be included in the feedback The feedback modes could be semi-statically configured through higher-layer (e.g. RRC) signalling similar to feedback configurations in previous release.

In another embodiment, a method for configuring transmission schemes that function in conjunction with CoMP transmissions is set forth.

With the feedback modes as described, the eNB can configure the UE to feedback separate CQI/PMI reporting for each TP. In addition the eNB can configure UE to derive and feedback joint CQI feedback reporting for all TPs, This allows enough flexibility at the eNB for its scheduling. For example, the eNB can schedule joint transmission or simply schedule single TP transmission to the UE. By doing so, a single closed-loop CoMP transmission mode can be configured which accommodates dynamic switching between CoMP and non-CoMP transmission.

In CoMP transmission, a plurality of transmissions can be supported as long as there exists a 1-to-1 mapping between DM-RS ports and layers. These transmissions would be the same to the UE in terms of UE reception. For example, a transmission where two TPs each transmit a different layer to the UE is supported. Also for example, a transmission where two TPs each transmit the same two layers to the UE is supported.

Other transmission modes could be configured for CoMP transmission. For example, the transmit diversity with precoding scheme could be configured. Alternatively, the transmit diversity without precoding could also be configured.

Accordingly, in certain embodiments, the network is able to configure the use of a closed-loop spatial multiplexing CoMP transmission modes. The transmission mode could support separate CQI/PMI reporting for each TP. In addition, a joint CQI feedback could be configured. Dynamic switching between CoMP and non-CoMP transmission could be supported by this mode. Also, in certain embodiments, the network is able to configure the use of an open-loop spatial multiplexing CoMP transmission mode, which does not need PMI feedback from the UE. Pre-defined or eNB determined precoding vectors could be applied at the TPs. Also, in certain embodiments, closed-loop and open-loop spatial multiplexing CoMP transmissions could be included within one transmission mode termed Spatial multiplexing CoMP transmission mode. The configuration of different feedback modes in the UE are used to achieve switching between closed-loop and open-loop operation. For example, if the UE is configured with CQI only (no PMI) feedback, open-loop transmission would be used, whilst if the UE is configured with PMI/CQI feedback, closed-loop transmission would be used. Also, in certain embodiments, transmit diversity with or without precoding could be configured for two TPs. Alamouti types of encoding could be applied to generate pairs of coded symbols, these pairs being potentially transmitted from different TPs. CQI calculation at the UE for feedback needs to assume Alamouti coding is used. Transmit diversity across multiple TPs could be configured as a separate transmission mode or could be used as a fall-back scheme for joint spatial multiplexing transmission across multiple TPs.

In another embodiment, a method for configuring transmission schemes which provides DCI support for CoMP transmission is set forth.

Known DCI formats could be reused for CoMP transmission, thus making the CoMP transmission transparent to the UE, or at least minimising its impact on existing signalling structures. In joint transmission, (wherein the same data layers are transmitted from multiple TPs), the same DM-RS ports could be used for each TP. Therefore, there is no need to signal additional DM-RS ports and a single DCI format such as DCI format 2C for TM9 could be used. If different layers are transmitted from different TPs, different DM-RS ports would need to be assigned to each TP. However, as long as there is a 1-to-1 association between a DM-RS port and a layer, no additional signalling is needed for UE demodulation. In general, up to four DM-RS ports need to be supported for CoMP transmission.

In other embodiments, methods for allowing a CSI-RS transmission in a cell with a plurality of TPs sharing the same cell ID are set forth.

One motivation behind the proposed scheme is to share the same CSI-RS configuration between different TPs in a frequency division manner. It is envisioned that by doing so, fewer CSI-RS configurations are needed in a cell and UE complexity in deriving CSI from these CSI-RS is reduced.

Figure 16:
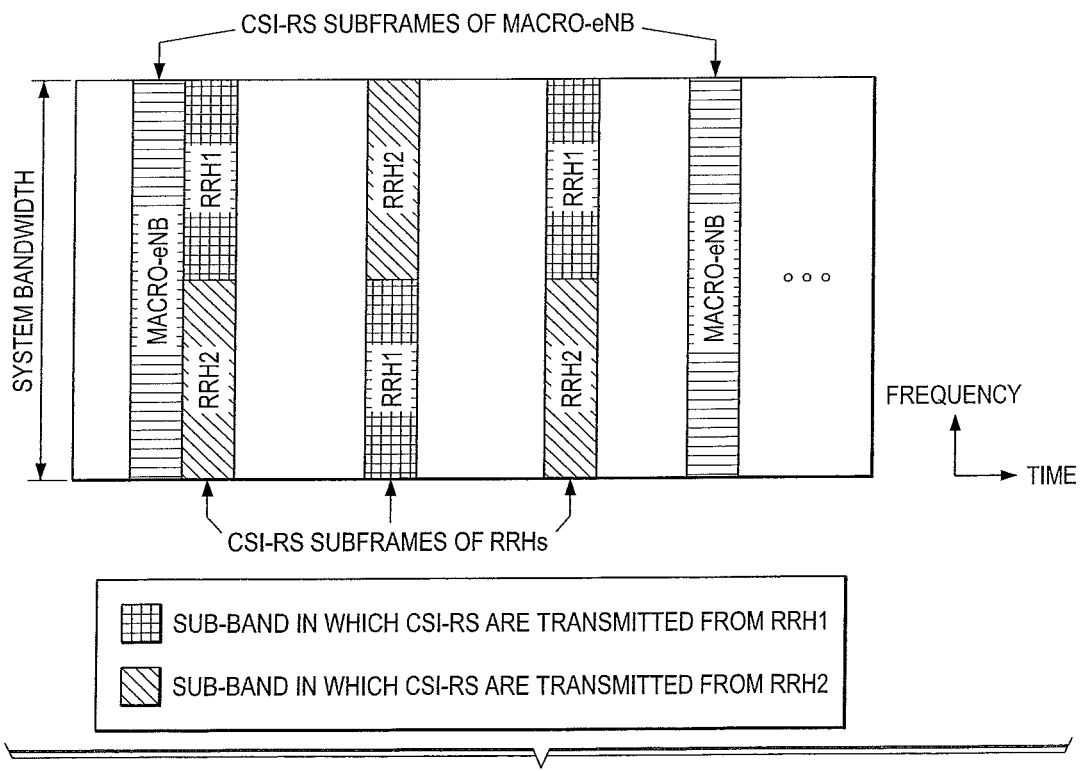
FIG. 16 shows a block diagram of an example of sharing of a CSI configuration between different RRH.

In one embodiment, one Rel-10 CSI-RS configuration is used for the macro eNB. The same configuration is also used by the RRHs. This configuration is signalled to all Rel-10 and post Rel-10 UEs. Another CSI-RS configuration is used for RRHs and is signalled to newer UEs only (e.g. those supporting CoMP). These two CSI-RS configurations may differ only by the CSI-RS patterns in a subframe. The second CSI-RS configuration is shared between all RRHs in a frequency division multiplexing fashion. Because the CSI-RS configuration is applicable to all RBs in the system bandwidth, each RRH transmits CSI-RS on a specific sub-band (frequency band) in each configured CSI-RS subframe. The sub-band containing CRS-RS for each RRH may hop from one CSI-RS subframe to another so that the full system bandwidth may be covered after certain number of CSI-RS subframes. The number of subframes needed to cover the whole bandwidth by a single RRH is equal to the number of RRHs in a cell. The hopping scheme could be either a specific pattern or as illustrated in FIG. 16, where the sub-band position of each RRH is shifted cyclically at each transmission opportunity.

Figure 17:
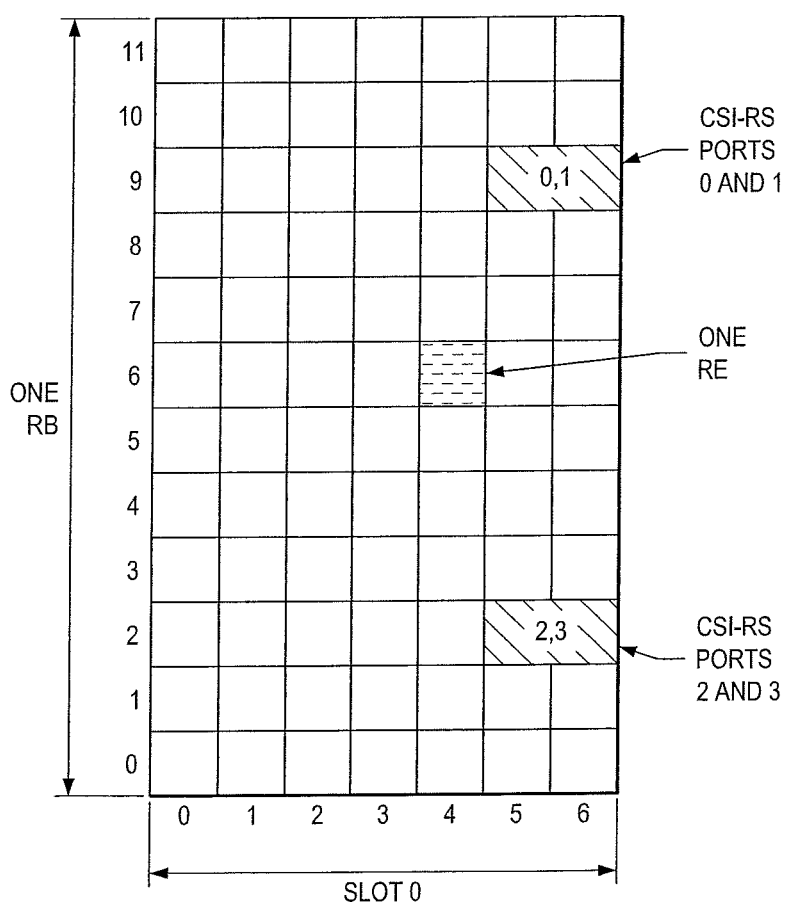
FIG. 17 shows a block diagram of an example of CSI-RS configuration.

For example, suppose a macro eNB with 2 RRHs in a 10 MHz system bandwidth. The CSI-RS configuration as shown in FIG. 17 uses resource element (RE) #9 of ODFM symbol #5 and #6 for antenna port 0/1, and resource element (RE) #2 of OFDM symbol #5 and #6 in each RB for antenna port 2/3. The scheme shares the CSI-RS configuration pattern between 2 RRHs as follows: the configuration is allocated for RRH1 for the frequency region spanning from RB#0 to 24 and then the same configuration is allocated for RRH2 for the frequency region corresponding to RB #25 to 49 where in this example the total number of RB in a 10 MHz system bandwidth is 50. The number of sub-bands (corresponding to the number of RRHs) and the number of antenna ports per sub-band need to be signalled as extra information in a semi-static (e.g. RRC) message to a set of UEs supporting CoMP (e.g. Rel-11 UEs). The size in RBs of the different sub-bands may also be signalled if they are different. This allocation will then cycle in time, so that the UE is able to measure the wideband channel from each RRH as depicted FIG. 16. The cycling period and pattern can be varying and depend on the number of RRHs and channel conditions.

The number of antenna ports per RRH needs to be signalled only once in a semi-static manner. Knowing the number of sub-bands and the RRH hopping pattern, the UE can derive the number of antenna ports supported in each sub-band in each CSI-RS subframe as the RRHs hop over the sub-bands in time.

The scheme presented above could be extended in a plurality of different ways. For example, to increase the accuracy of the CSI measurements, the whole macro eNB coverage area could be divided into regions, where each region is configured with one CSI-RS configuration for UEs supporting CoMP, and each region contains more than one RRH. All the RRHs in the same region would share the same CSI-RS configuration as described above. This would allow CoMP UEs to report CSI only for the configured RRHs instead of reporting CSI for all RRHs.

Another extension includes the RRH sharing the same configuration (same resources/pattern, offset, periodicity) across the whole band, but the CSI-RS for each RRH are differentiated by CDM (code division multiplexing).

Such a scheme for allowing a CSI-RS transmission in a cell with a plurality of TPs sharing the same cell ID provides a plurality of advantages. For example, such methods are backward compatible for legacy UEs. The scheme presented above is transparent to non-CoMP (e.g. Rel-10) UEs. A configuration is reserved for the macro-eNB and is signalled to Rel-10 UEs and post Rel-10 UEs. Additionally, with such a scheme, the need of RRH association for CSI feedback is removed. The eNB uses the feedback now to semi-statically reconfigure CSI-RS configuration if needed since it has a total feedback from all RRHs. Additionally, such a scheme reduces unnecessary signalling overhead. The eNB needs not track when the UEs are moving between RRHs hence will not need to signal a new CSI-configuration each time. Additionally, with such a scheme, the CSI latency feedback report is reduced since only one offset is used. The periodicity can be adapted to the number of RRH supported in the macro eNB cell or the region. Additionally, such a scheme reduces impact of interference on adjacent cells since only one extra CSI-RS configuration is needed. Additionally, with such a scheme, rate matching is simplified since the location of the CSI-RS are known and fixed. Additionally, with such a scheme there is no need for signalling every time a UE moves from one RRH coverage to another. The artificial handover kind of problem created by the existing scenario is removed. Additionally, the management and assignment of CSI-RS configuration is simplified.

Accordingly, in certain embodiments, CSI-RS for each TP has the same pattern and transmits on the same bandwidth, but from different sub-bands. The sub-band on which the CSI-RS are transmitted for each TP hops across the whole system bandwidth over time. The hopping pattern of CRS-RS for each TP follows the same cycle but with different offset. The CSI-RS for macro-eNB can be transmitted following the same rule as a TP or can be transmitted separately across the whole system bandwidth.

Figure 18:
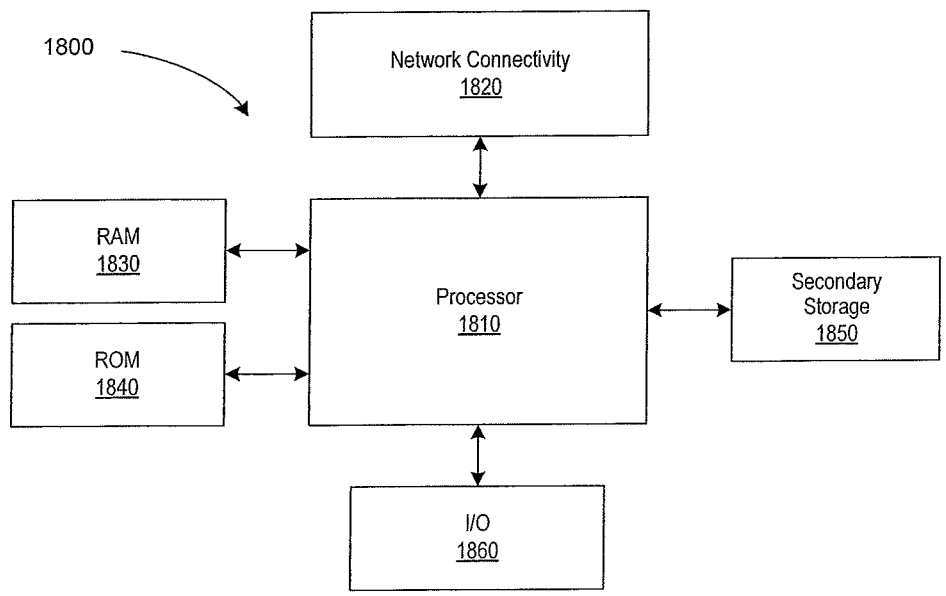
FIG. 18 shows a block diagram of a wireless device according to one embodiment.

FIG. 18 illustrates an example of a system 1800 suitable for implementing one or more embodiments disclosed herein. In various embodiments, the system 1800 comprises a processor 1810, which may be referred to as a central processor unit (CPU) or digital signal processor (DSP), network connectivity interfaces 1820, random access memory (RAM) 1830, read only memory (ROM) 1840, secondary storage 1850, and input/output (I/O) devices 1860. In some embodiments, some of these components may not be present or may be combined in various combinations with one another or with other components not shown. These components may be located in a single physical entity or in more than one physical entity. Any actions described herein as being taken by the processor 1810 might be taken by the processor 1810 alone or by the processor 1810 in conjunction with one or more components shown or not shown in FIG. 18.

The processor 1810 executes instructions, codes, computer programs, or scripts that it might access from the network connectivity interfaces 1820, RAM 1830, or ROM 1840. While only one processor 1810 is shown, multiple processors may be present. Thus, while instructions may be discussed as being executed by a processor 1810, the instructions may be executed simultaneously, serially, or otherwise by one or multiple processors 1810 implemented as one or more CPU chips.

In various embodiments, the network connectivity interfaces 1820 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 1820 may enable the processor 1810 to communicate with the Internet or one or more telecommunications networks or other networks from which the processor 1810 might receive information or to which the processor 1810 might output information.

The network connectivity interfaces 1820 may also be capable of transmitting or receiving data wirelessly in the form of electromagnetic waves, such as radio frequency signals or microwave frequency signals. Information transmitted or received by the network connectivity interfaces 1820 may include data that has been processed by the processor 1810 or instructions that are to be executed by processor 1810. The data may be ordered according to different sequences as may be desirable for either processing or generating the data or transmitting or receiving the data.

In various embodiments, the RAM 1830 may be used to store volatile data and instructions that are executed by the processor 1810. The ROM 1840 shown in FIG. 18 may likewise be used to store instructions and data that is read during execution of the instructions. The secondary storage 1850 is typically comprised of one or more disk drives or tape drives and may be used for non-volatile storage of data or as an overflow data storage device if RAM 1830 is not large enough to hold all working data. Secondary storage 1850 may likewise be used to store programs that are loaded into RAM 1830 when such programs are selected for execution. The I/O devices 1860 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 19:
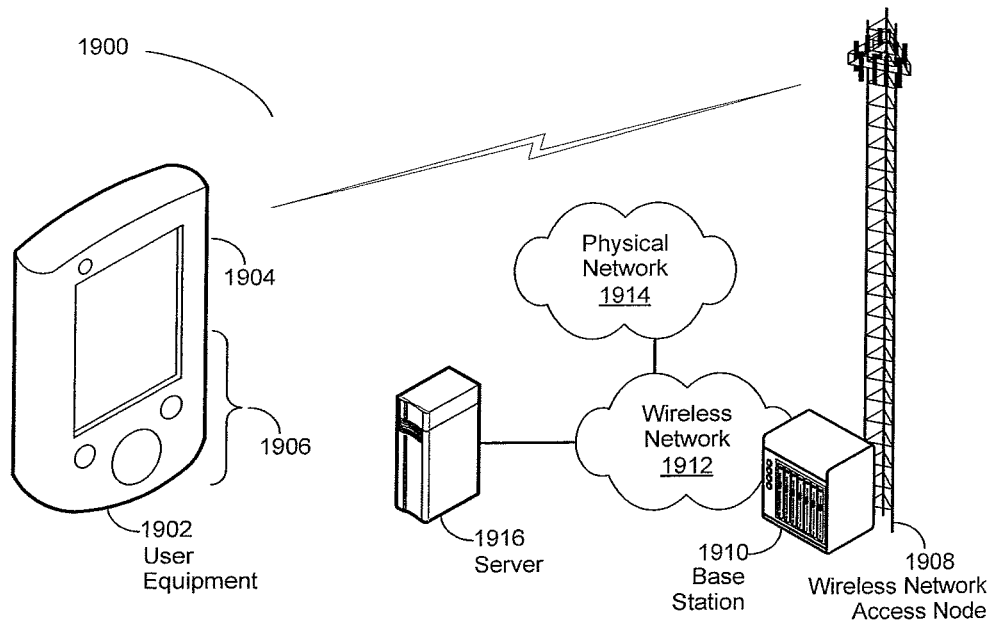
FIG. 19 shows a wireless-enabled communications environment including an embodiment of a client node.

FIG. 19 shows a wireless-enabled communications environment including an embodiment of a client node as implemented in an embodiment of the invention. Though illustrated as a mobile phone, the client node 1902 may take various forms including a wireless handset, a pager, a smart phone, or a personal digital assistant (PDA). In various embodiments, the client node 1902 may also comprise a portable computer, a tablet computer, a laptop computer, or any computing device operable to perform data communication operations. Many suitable devices combine some or all of these functions. In some embodiments, the client node 1902 is not a general purpose computing device like a portable, laptop, or tablet computer, but rather is a special-purpose communications device such as a telecommunications device installed in a vehicle. The client node 1902 may likewise be a device, include a device, or be included in a device that has similar capabilities but that is not transportable, such as a desktop computer, a set-top box, or a network node. In these and other embodiments, the client node 1902 may support specialized activities such as gaming, inventory control, job control, task management functions, and so forth.

In various embodiments, the client node 1902 includes a display 1904. In these and other embodiments, the client node 1902 may likewise include a touch-sensitive surface, a keyboard or other input keys 1906 generally used for input by a user. The input keys 1906 may likewise be a full or reduced alphanumeric keyboard such as QWERTY, Dvorak, AZERTY, and sequential keyboard types, or a traditional numeric keypad with alphabet letters associated with a telephone keypad. The input keys 1906 may likewise include a trackwheel, an exit or escape key, a trackball, and other navigational or functional keys, which may be inwardly depressed to provide further input function. The client node 1902 may likewise present options for the user to select, controls for the user to actuate, and cursors or other indicators for the user to direct.

The client node 1902 may further accept data entry from the user, including numbers to dial or various parameter values for configuring the operation of the client node 1902. The client node 1902 may further execute one or more software or firmware applications in response to user commands. These applications may configure the client node 1902 to perform various customized functions in response to user interaction. Additionally, the client node 1902 may be programmed or configured over-the-air (OTA), for example from a wireless network access node 1908 (e.g., a base station), a server node 1916 (e.g., a host computer), or a peer client node 1902.

Among the various applications executable by the client node 1902 are a web browser, which enables the display 1904 to display a web page. The web page may be obtained from a server node 1916 through a wireless connection with a wireless network 1912. As used herein, a wireless network 1912 broadly refers to any network using at least one wireless connection between two of its nodes. The various applications may likewise be obtained from a peer client node 1902 or other system over a connection to the wireless network 1912 or any other wirelessly-enabled communication network or system.

In various embodiments, the wireless network 1912 comprises a plurality of wireless sub-networks (e.g., cells with corresponding coverage areas). As used herein, the wireless sub-networks may variously comprise a mobile wireless access network or a fixed wireless access network. In these and other embodiments, the client node 1902 transmits and receives communication signals, which are respectively communicated to and from the wireless network nodes by wireless network antennas (e.g., cell towers). In turn, the communication signals are used by the wireless network access nodes to establish a wireless communication session with the client node 1902. As used herein, the network access nodes broadly refer to any access node of a wireless network. The wireless network access nodes may be respectively coupled to wireless sub-networks, which may in turn be connected to the wireless network 1912.

In various embodiments, the wireless network 1912 is coupled to a physical network 1914, such as the Internet. Via the wireless network 1912 and the physical network 1914, the client node 1902 has access to information on various hosts, such as the server node 1916. In these and other embodiments, the server node 1916 may provide content that may be shown on the display 1904 or used by the client node processor 1810 for its operations. Alternatively, the client node 1902 may access the wireless network 1912 through a peer client node 1902 acting as an intermediary, in a relay type or hop type of connection. As another alternative, the client node 1902 may be tethered and obtain its data from a linked device that is connected to the wireless network 1912. Skilled practitioners of the art will recognize that many such embodiments are possible and the foregoing is not intended to limit the spirit, scope, or intention of the disclosure.

Figure 20:
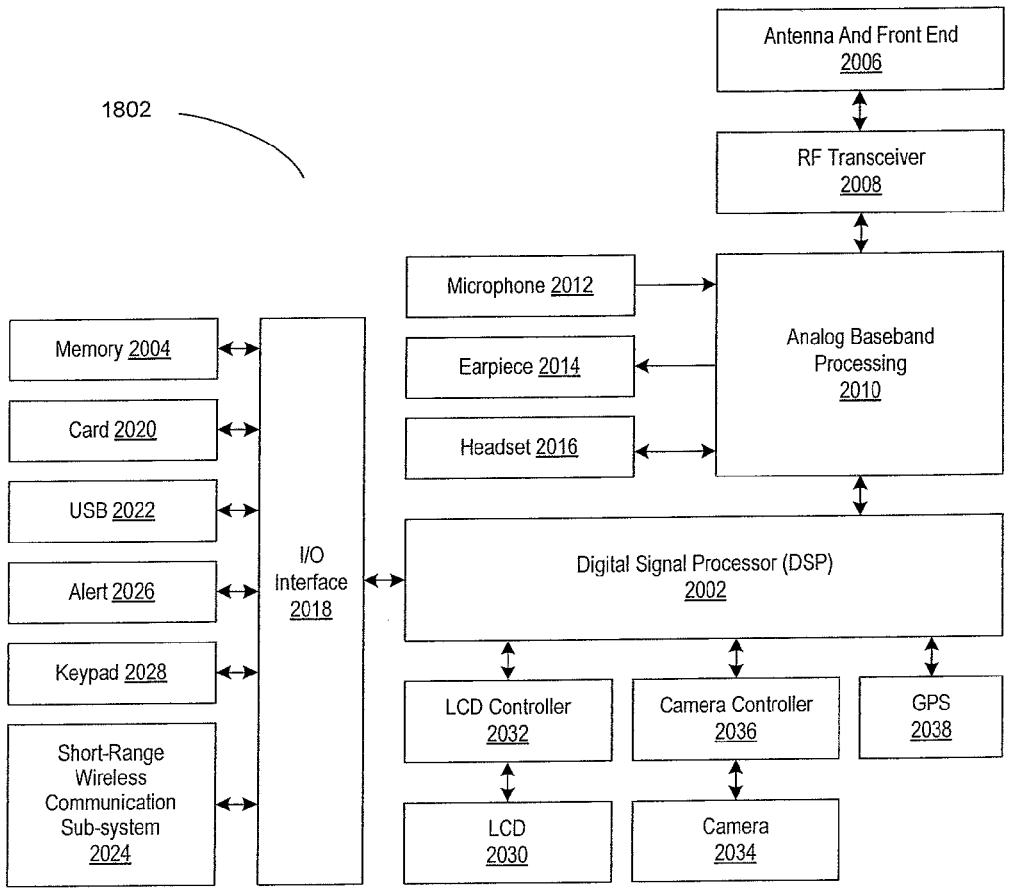
FIG. 20 is a simplified block diagram of an exemplary client node including a digital signal processor (DSP).

FIG. 20 depicts a block diagram of an exemplary client node as implemented with a digital signal processor (DSP) in accordance with an embodiment of the invention. While various components of a client node 1902 are depicted, various embodiments of the client node 1902 may include a subset of the listed components or additional components not listed. As shown in FIG. 20, the client node 1902 includes a DSP 2002 and a memory 2004. As shown, the client node 1902 may further include an antenna and front end unit 2006, a radio frequency (RF) transceiver 2008, an analog baseband processing unit 2010, a microphone 2012, an earpiece speaker 2014, a headset port 2016, a bus 2018, such as a system bus or an input/output (I/O) interface bus, a removable memory card 2020, a universal serial bus (USB) port 2022, a short range wireless communication sub-system 2024, an alert 2026, a keypad 2028, a liquid crystal display (LCD) 2030, which may include a touch sensitive surface, an LCD controller 2032, a charge-coupled device (CCD) camera 2034, a camera controller 2036, and a global positioning system (GPS) sensor 2038, and a power management module operably coupled to a power storage unit, such as a battery. In various embodiments, the client node 1902 may include another kind of display that does not provide a touch sensitive screen. In one embodiment, the DSP 2002 communicates directly with the memory 2004 without passing through the input/output interface 2018.

In various embodiments, the DSP 2002 or some other form of controller or central processing unit (CPU) operates to control the various components of the client node 1902 in accordance with embedded software or firmware stored in memory 2004 or stored in memory contained within the DSP 2002 itself. In addition to the embedded software or firmware, the DSP 2002 may execute other applications stored in the memory 2004 or made available via information carrier media such as portable data storage media like the removable memory card 2020 or via wired or wireless network communications. The application software may comprise a compiled set of machine-readable instructions that configure the DSP 2002 to provide the desired functionality, or the application software may be high-level software instructions to be processed by an interpreter or compiler to indirectly configure the DSP 2002.

The antenna and front end unit 2006 may be provided to convert between wireless signals and electrical signals, enabling the client node 1902 to send and receive information from a cellular network or some other available wireless communications network or from a peer client node 1902. In an embodiment, the antenna and front end unit 1806 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 2006 may include antenna tuning or impedance matching components, RF power amplifiers, or low noise amplifiers.

In various embodiments, the RF transceiver 2008 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 2010 or the DSP 2002 or other central processing unit. In some embodiments, the RF Transceiver 2008, portions of the Antenna and Front End 2006, and the analog base band processing unit 2010 may be combined in one or more processing units and/or application specific integrated circuits (ASICs).

The analog baseband processing unit 2010 may provide various analog processing of inputs and outputs, for example analog processing of inputs from the microphone 2012 and the headset 2016 and outputs to the earpiece 2014 and the headset 2016. To that end, the analog baseband processing unit 2010 may have ports for connecting to the built-in microphone 2012 and the earpiece speaker 2014 that enable the client node 1902 to be used as a cell phone. The analog baseband processing unit 2010 may further include a port for connecting to a headset or other hands-free microphone and speaker configuration. The analog baseband processing unit 2010 may provide digital-to-analog conversion in one signal direction and analog-to-digital conversion in the opposing signal direction. In various embodiments, at least some of the functionality of the analog baseband processing unit 2010 may be provided by digital processing components, for example by the DSP 2002 or by other central processing units.

The DSP 2002 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 2002 may perform modulation, coding, interleaving, and spreading, and for a receiver function the DSP 2002 may perform despreading, deinterleaving, decoding, and demodulation. In another embodiment, for example in an orthogonal frequency division multiplex access (OFDMA) technology application, for the transmitter function the DSP 2002 may perform modulation, coding, interleaving, inverse fast Fourier transforming, and cyclic prefix appending, and for a receiver function the DSP 2002 may perform cyclic prefix removal, fast Fourier transforming, deinterleaving, decoding, and demodulation. In other wireless technology applications, yet other signal processing functions and combinations of signal processing functions may be performed by the DSP 2002.

The DSP 2002 may communicate with a wireless network via the analog baseband processing unit 2010. In some embodiments, the communication may provide Internet connectivity, enabling a user to gain access to content on the Internet and to send and receive e-mail or text messages. The input/output interface 2018 interconnects the DSP 2002 and various memories and interfaces. The memory 2004 and the removable memory card 2020 may provide software and data to configure the operation of the DSP 2002. Among the interfaces may be the USB interface 2022 and the short range wireless communication sub-system 2024. The USB interface 2022 may be used to charge the client node 1902 and may also enable the client node 1902 to function as a peripheral device to exchange information with a personal computer or other computer system. The short range wireless communication sub-system 2024 may include an infrared port, a Bluetooth interface, an IEEE 802.11 compliant wireless interface, or any other short range wireless communication sub-system, which may enable the client node 1902 to communicate wirelessly with other nearby client nodes and access nodes.

The input/output interface 2018 may further connect the DSP 2002 to the alert 2026 that, when triggered, causes the client node 1902 to provide a notice to the user, for example, by ringing, playing a melody, or vibrating. The alert 2026 may serve as a mechanism for alerting the user to any of various events such as an incoming call, a new text message, and an appointment reminder by silently vibrating, or by playing a specific pre-assigned melody for a particular caller.

The keypad 2028 couples to the DSP 2002 via the I/O interface 2018 to provide one mechanism for the user to make selections, enter information, and otherwise provide input to the client node 1902. The keyboard 2028 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 2030, which may include touch screen capability and also display text and/or graphics to the user. The LCD controller 2032 couples the DSP 2002 to the LCD 2030.

The CCD camera 2034, if equipped, enables the client node 1902 to take digital pictures. The DSP 2002 communicates with the CCD camera 2034 via the camera controller 2036. In another embodiment, a camera operating according to a technology other than Charge Coupled Device cameras may be employed. The GPS sensor 2038 is coupled to the DSP 2002 to decode global positioning system signals or other navigational signals, thereby enabling the client node 1902 to determine its position. Various other peripherals may also be included to provide additional functions, such as radio and television reception.

Figure 21:
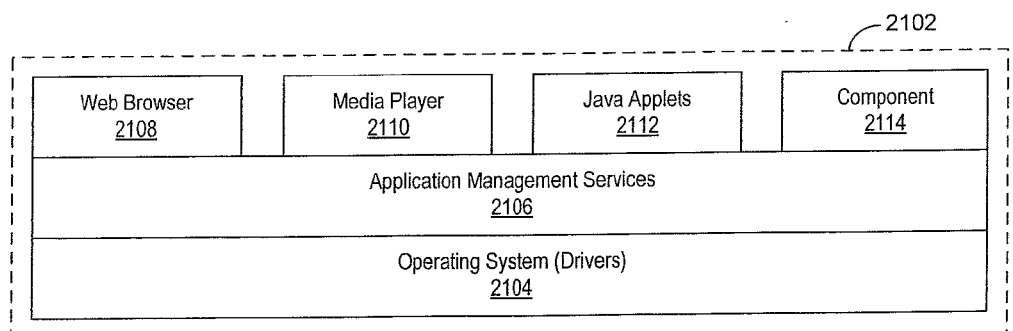
FIG. 21 is a simplified block diagram of a software environment that may be implemented by a DSP.

FIG. 21 illustrates a software environment 2102 that may be implemented by a digital signal processor (DSP). In this embodiment, the DSP 2002 shown in FIG. 20 executes an operating system 2104, which provides a platform from which the rest of the software operates. The operating system 2104 likewise provides the client node 1902 hardware with standardized interfaces (e.g., drivers) that are accessible to application software. The operating system 2104 likewise comprises application management services (AMS) 2106 that transfer control between applications running on the client node 1902. Also shown in FIG. 21 are a web browser application 2108, a media player application 2110, and Java applets 2112. The web browser application 2108 configures the client node 1902 to operate as a web browser, allowing a user to enter information into forms and select links to retrieve and view web pages. The media player application 2110 configures the client node 1902 to retrieve and play audio or audiovisual media. The Java applets 2112 configure the client node 1902 to provide games, utilities, and other functionality. A component 2114 may provide functionality described herein. In various embodiments, the client node 1902, the wireless network node 1908, and the server node 1916 shown in FIG. 19 may likewise include a processing component that is capable of executing instructions related to the actions described above.

As used herein, the terms "component," "system," and the like are intended to refer to a computer-related entity, either hardware, a combination of hardware and software, software, software in execution. For example, a component may be, but is not limited to being, a process running on a processor, a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, home location registers, Gateway GPRS Support Nodes (GGSN), and Serving GPRS Support Nodes (SGSN).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc.) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

Although the described exemplary embodiments disclosed herein are described with reference to certain example embodiments, the present disclosure is not necessarily limited to the example embodiments which illustrate inventive aspects of the present disclosure that are applicable to a wide variety of authentication algorithms. Thus, the particular embodiments disclosed above are illustrative only and should not be taken as limitations upon the present disclosure, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for configuring a feedback scheme, the feedback scheme function in conjunction with coordinated multiple-point (CoMP) transmissions in a wireless system with a plurality of transmission points, the method comprising:
configuring a wireless device to support feedback of a rank indicator (RI) report including one of a common RI for all transmission points in the plurality of transmission points and a separate RI for each of the plurality of transmission points;
configuring the wireless device to support feedback of a separate Precoding Matrix indicator (PMI) report for each of the plurality of transmission points; and
defining at least one of a separate Channel Quality Indicator (CQI) report for each of the plurality of transmission points, a common CQI report for all of the transmission points, and both separate CQI and common CQI reports;
wherein a plurality of reports comprising the RI report, the separate CQI/PMI reports, and the common CQI report are fed back to a node B via a single transmission point selected from the plurality of transmission points,
wherein, when the plurality of reports comprises at least one report transmitted via a Physical Uplink Shared Channel (PUSCH) and at least one report transmitted via a Physical Uplink Shared Channel (PUSCH), the common CQI report and at least one of the RI report, the PMI reports, and the separate CQI reports are transmitted via the PUCCH, and the common CQI report and at least one of the RI report, the PMI reports, and the separate CQI reports are transmitted via the PUSCH.

2. The method of claim 1 further comprising:
transmitting the plurality of reports via at least one of the PUCCH and the PUSCH, the plurality of reports comprising:
the RI report including one of the common RI for all of the transmission points or the separate RIs for each of the plurality of transmission points,
the separate PMI reports for each of the plurality of transmission points, and
the separate CQI reports for each of the plurality of transmission points and/or the common CQI report; and wherein
when the common report and at least one of the RI report, the PMI reports, and at least one of the separate CQI reports are transmitted via the PUCCH, different reports from different transmission points are transmitted via the PUCCH different subframes in a Time Division Multiplexed (TDM) manner.

3. The method of claim 1 wherein:
the separate RI for each of the plurality of transmission points is jointly encoded and transmitted together in the same RI report fed back to the node B.

4. The method of claim 1 further comprising:
extending feedback modes to report feedback on at least one of PUCCH and PUSCH for closed-loop transmission, the extended feedback modes corresponding to 3GPP release 8 feedback modes 1-1, 2-1 for feedback PUCCH, and modes 3-1, 1-2 and 2-2 for feedback on the PUSCH.

5. The method of claim 1 further comprising:
extending feedback modes to report feedback on at least one of PUCCH and PUSCH feedback modes for open-loop transmission, the extended feedback modes corresponding to 3GPP release 8 feedback modes 1-0, 2-0 for feedback on the PUCCH, and modes 2-0, 3-0 and 2-2 for feedback on the PUSCH.

6. The method of claim 4 wherein:
joint CQI reports are derived and fed-back for at least one of the extended feedback modes.

7. The method of claim 4, wherein feedback reports for different TPs are transmitted in an alternating manner in different subframes in the extended PUCCH feedback modes.

8. The method of claim 4, wherein the same type of feedback reports for different TPs are combined and transmitted in the same report in the extended PUCCH feedback modes.

9. The method of claim 6 wherein:
when the wireless device is configured to select a set of best M sub-bands for reporting feedback of transmission from transmission points corresponding to the selected sub-bands, selection of a best-M sub-band is based on joint CQI from the plurality of transmission points rather than individual CQI for each transmission point.

10. The method of claim 9 wherein:
for selected sub-band reporting, a UE derives and feeds back separate CQI/PMI reporting for each transmission point based on selected sub-bands but assumes individual transmission from each transmission points.

11. The method of claim 10 wherein:
for selected sub-band reporting, the UE derives and feeds back joint CQIs for each selected sub-band by assuming joint transmission from all participating transmission points.

* * * * *